(12) United States Patent
Eguchi

(10) Patent No.: US 8,243,371 B2
(45) Date of Patent: Aug. 14, 2012

(54) HIGH ZOOM-RATIO ZOOM LENS SYSTEM

(75) Inventor: Masaru Eguchi, Saitama (JP)

(73) Assignee: Hoya Corporation, Tokyo (JP)

(*) Notice: Subject to any disclaimer, the term of this patent is extended or adjusted under 35 U.S.C. 154(b) by 0 days.

(21) Appl. No.: 13/038,601

(22) Filed: Mar. 2, 2011

(65) Prior Publication Data

US 2011/0216423 A1 Sep. 8, 2011

(30) Foreign Application Priority Data

Mar. 5, 2010 (JP) ................ 2010-049156

(51) Int. Cl.
 *G02B 15/14* (2006.01)
(52) U.S. Cl. .................................... 359/687
(58) Field of Classification Search .......... 359/676, 359/683, 687
 See application file for complete search history.

(56) References Cited

U.S. PATENT DOCUMENTS

| | | | |
|---|---|---|---|
| 5,570,233 A | 10/1996 | Mihara et al. | |
| 2006/0262422 A1 | 11/2006 | Ohashi | |
| 2007/0058268 A1* | 3/2007 | Terada | 359/687 |
| 2007/0070524 A1 | 3/2007 | Sato | |
| 2009/0168196 A1* | 7/2009 | Kimura | 359/687 |
| 2010/0134901 A1* | 6/2010 | Kimura | 359/687 |

FOREIGN PATENT DOCUMENTS

| | | |
|---|---|---|
| JP | 3304518 | 7/2002 |
| JP | 2006-308957 | 11/2006 |
| JP | 2007-122019 | 5/2007 |

OTHER PUBLICATIONS

U.S. Appl. No. 13/038,581 to Masaru Eguchi, which was filed Mar. 2, 2011.

* cited by examiner

*Primary Examiner* — Scott J Sugarman
(74) *Attorney, Agent, or Firm* — Greenblum & Bernstein P.L.C.

(57) ABSTRACT

A high zoom-ratio zoom lens system includes a positive first lens group, a negative second lens group, a positive third lens group, and a positive fourth lens group, in that order from the object side, wherein upon zooming from the short to the long focal length extremities, the first through fourth lens groups are moved along the optical axis direction, wherein an amount of movement of the first lens group is greater than that of the third lens group. The following conditions (1) and (2) are satisfied:

$$1.4 < FT/F1 < 2.4 \quad (1), \text{ and}$$

$$5 < M2T/M2W < 10 \quad (2),$$

wherein FT designates the entire focal length at the long focal length extremity, F1 designates the focal length of the first lens group, and M2T and M2W designate the magnification of the second lens group with respect to an object at infinity at the long and short focal length extremities, respectively.

7 Claims, 31 Drawing Sheets

HIGH ZOOM-RATIO ZOOM LENS SYSTEM

BACKGROUND OF THE INVENTION

1. Field of the Invention

The present invention relates to a high zoom-ratio zoom lens system that is suitable as an imaging optical system, mainly for use with an image sensor, which includes a wide-angle range of an angle-of-view of 70 degrees or greater.

2. Description of Related Art

In recent years, in the field of compact digital cameras, the demand for high zoom-ratio zoom lens systems that include a wide-angle range has increased. On the other hand, miniaturization of the pixel pitch has increased, so that a high resolution is demanded in the optical system. It is common to employ, in imaging lenses for use in mainly compact digital cameras, a retractable-barrel mechanism that uses a so-called multi-stage barrel that reduces the air-distance between lens groups at a fully-retracted (accommodated) state in order to achieve a slimmer (i.e., shorter in the optical axis direction) camera body. In addition to reducing the thickness of each lens group in a lens system that is suitable for such a retractable-barrel mechanism, it is also necessary for the frontmost lens to be small in diameter, and furthermore, for this lens system to be designed with consideration of the mechanical restrictions in regard to the overall length thereof.

As an example of a zoom lens system for use in a high zoom-ratio compact digital camera, a zoom lens system such as that disclosed in Japanese Unexamined Patent Publication No. 2006-308957 is known in the art, in which a relatively small number of lens elements are utilized, further miniaturization is achieved, and a wide angle-of-view of approximately 78 degrees is achieved at the short focal length extremity (wide-angle extremity). However, the zoom ratio is approximately 4:1 through 7:1, which is unsatisfactory.

As an example of a zoom lens system having a zoom ratio of approximately 10:1, zoom lens system such as that disclosed in Japanese Patent No. 3,304,518 is known in the art. However, the overall length of the zoom lens system with respect to the focal length and the zoom ratio is long, hence, this zoom lens system is not sufficiently miniaturized. Furthermore, in a zoom lens system disclosed in Japanese Unexamined Patent Publication No. 2007-122019, a wide angle-of-view is not achieved and the zoom ratio is insufficient, and the overall length of the zoom lens system is also long, and hence, this zoom lens system is also not sufficiently miniaturized.

SUMMARY OF THE INVENTION

The present invention provides a high zoom-ratio zoom lens system that has a zoom ratio approximately 15:1 through 20:1, has an angle-of-view of 70 degrees or greater at the short focal length extremity, the frontmost lens thereof has a small diameter, has a short overall length at the short focal length extremity, and is ideal for a retractable-barrel camera.

According to an aspect of the present invention, a high zoom-ratio zoom lens system is provided, including a positive first lens group, a negative second lens group, a positive third lens group, and a positive fourth lens group, in that order from the object side. Upon zooming from the short focal length extremity to the long focal length extremity, each of the first through fourth lens groups are moved along the optical axis direction, wherein an amount of movement of the first lens group along the optical axis direction is greater than that of the third lens group. The following conditions (1) and (2) are satisfied:

$$1.4 < FT/F1 < 2.4 \quad (1), \text{ and}$$

$$5 < M2T/M2W < 10 \quad (2),$$

wherein FT designates the entire focal length at the long focal length extremity, F1 designates the focal length of the first lens group, M2T designates the magnification of the second lens group with respect to an object at infinity at the long focal length extremity, and M2W designates the magnification of the second lens group with respect to an object at infinity at the short focal length extremity.

It is desirable for a lens element that is provided closest to the object side within the third lens group to be a positive lens element having an aspherical surface on at least one side thereof and to satisfy the following condition (3):

$$5 < FT/fa < 15 \quad (3),$$

wherein FT designates the focal length of the entire the zoom lens system at the long focal length extremity, and fa designates the focal length of the positive lens element that is provided closest to the object side within the third lens group.

It is desirable for the following conditions (4) and (5) to be satisfied:

$$1.9 < n1 \quad (4), \text{ and}$$

$$25 < v1 < 35 \quad (5),$$

wherein n1 designates the refractive index at the d-line of the lens element that is provided closest to the object side within the first lens group, and v1 designates the Abbe number with respect to the d-line of the lens element that is provided closest to the object side within the first lens group.

It is desirable for the first lens group to include a negative lens element, a positive lens element and a positive lens element, in that order from the object side, wherein the following condition (6) is satisfied:

$$136 < v2 + v3 \quad (6),$$

wherein v2 designates the Abbe number with respect to the d-line of the positive lens element that is provided on the object side within the first lens group, and v3 designates the Abbe number with respect to the d-line of the positive lens element that is provided on image side within the first lens group.

It is desirable for the third lens group to include two positive lens elements, and wherein the following condition (7) is satisfied:

$$145 < v4 + v5 \quad (7),$$

wherein v4 designates the Abbe number with respect to the d-line of one of the two positive lens elements of the third lens group, and v5 designates the Abbe number with respect to the d-line of the other of the two positive lens elements of the third lens group.

It is desirable for the second lens group to include a positive lens element having an aspherical surface on at least one side thereof, and wherein the following condition (8) is satisfied:

$$v6 < 20 \quad (8),$$

wherein v6 designates the Abbe number with respect to the d-line of the positive lens element having the aspherical surface on at least one side that is provided in the second lens group.

It is desirable for the fourth lens group to constitute a focusing lens group which is moved along the optical axis direction during a focusing operation, the fourth lens group including a positive lens element having an aspherical surface on at least one side thereof, and a negative lens element having an aspherical surface on at least one side thereof, in that order from the object side. The following condition (9) is satisfied:

$$|\nu a - \nu b| > 25 \tag{9},$$

wherein va designates the Abbe number with respect to the d-line of the positive lens element that is provided within the fourth lens group, and vb designates the Abbe number with respect to the d-line of the negative lens element that is provided within the fourth lens group.

According to the present invention, a high zoom-ratio zoom lens system that has a zoom ratio approximately 15:1 through 20:1, has an angle-of-view of 70 degrees or greater at the short focal length extremity, the frontmost lens thereof has a small diameter, has a short overall length at the short focal length extremity, and is suitable for a retractable-barrel camera is achieved.

The present disclosure relates to subject matter contained in Japanese Patent Application No. 2010-49156 (filed on Mar. 5, 2010) which is expressly incorporated herein in its entirety.

BRIEF DESCRIPTION OF THE DRAWINGS

The present invention will be discussed below in detail with reference to the accompanying drawings, in which.

DESCRIPTION OF THE PREFERRED EMBODIMENTS

Figure 31:
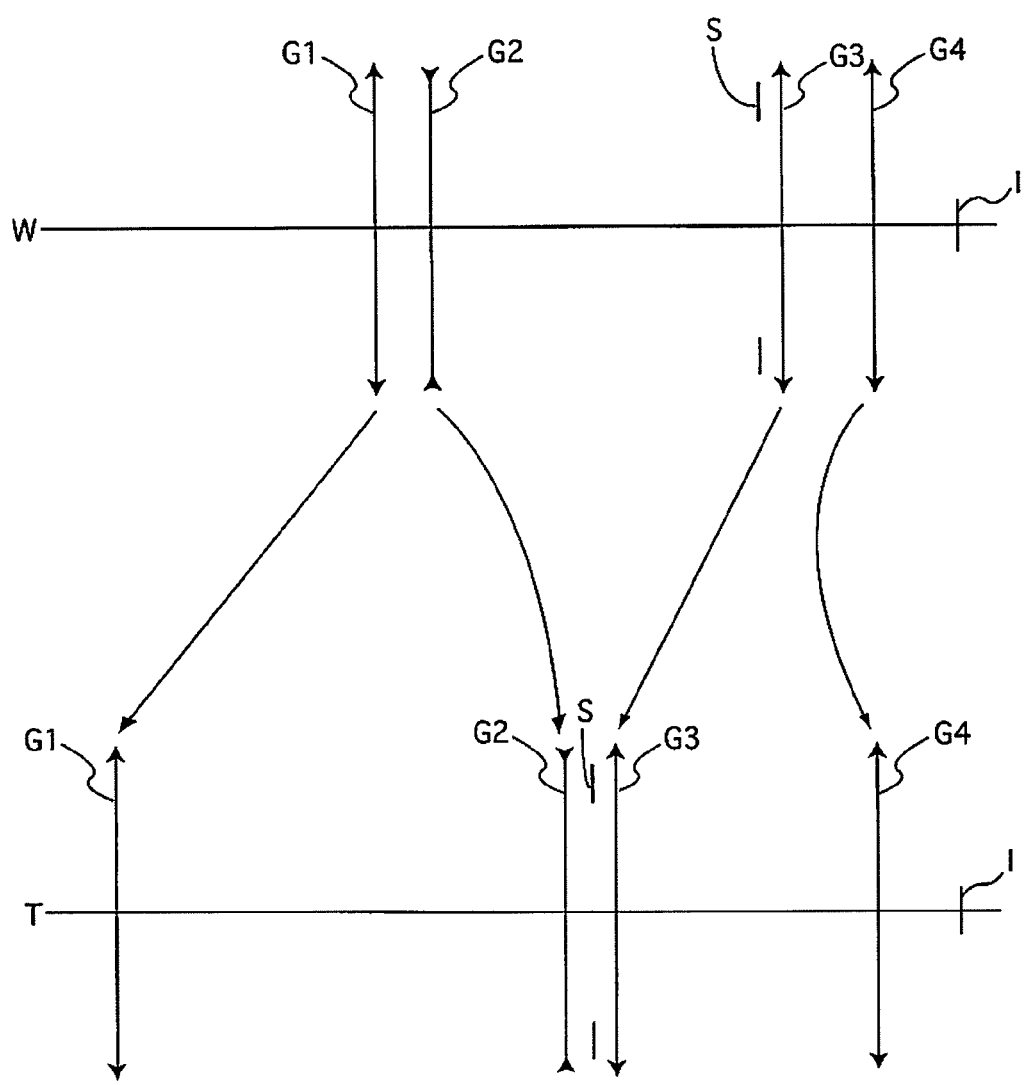
FIG. 31 shows a zoom path of the zoom lens system according to the present invention.

The high zoom-ratio zoom lens system according to the present invention includes, as shown in the zoom path diagram of FIG. 31, a positive first lens group G1, a negative second lens group G2, a positive third lens group G3 and a positive fourth lens group G4, in that order from the object side. A diaphragm S is provided in between the second lens group G2 and the third lens group G3, and moves integrally with the third lens group G3 during zooming. "I" designates the image plane.

Upon zooming from the short focal length extremity (W) to the long focal length extremity (T), each of the first through fourth lens groups G1 through G4 move along the optical axis so that the distance between the first lens group G1 and the second lens group G2 increases, the distance between the second lens group G2 and the third lens group G3 decreases, and the distance between the third lens group G3 and the fourth lens group G4 increases.

More specifically, upon zooming from the short focal length extremity to the long focal length extremity, the first lens group G1 moves monotonically toward the object side; the second lens group G2 moves monotonically toward the image side while plotting a convex moving path toward the image side; the third lens group G3 moves monotonically toward the object side; and the fourth lens group G4 first moves toward the object side and thereafter moves toward the image side.

The amount of movement of the first lens group G1, which moves monotonically toward the object side, is greater than the amount of movement of the third lens group G3 that likewise moves monotonically toward the object side.

As shown in each of the first through fifth numerical embodiments, the first lens group G1 is configured of a negative lens element 10, a positive lens element 11 and a positive lens element 12, in that order from the object side. In each of the first through fifth numerical embodiments, the negative lens element 10 is a negative meniscus lens element having a convex surface on the object side, and the positive lens element 11 is a positive meniscus lens element having a convex surface on the object side. The positive lens element 12 is a positive meniscus lens element having a convex surface on the object side (first and second numerical embodiments) or is a planoconvex positive lens element having a convex surface on the object side (third through fifth numerical embodiments).

As shown in each of the first through fifth numerical embodiments, the second lens group G2 is configured of a negative lens element 20, a negative lens element 21 and a positive lens element 22, in that order from the object side. The negative lens element 20 is a negative meniscus lens element having a convex surface on the object side (first and third through fifth numerical embodiments) or a biconcave negative lens element (second numerical embodiment). The negative lens element 21 is a biconcave negative lens element. The positive lens element 22 is a positive meniscus lens element having a convex surface on the object side, and has an aspherical surface on each side thereof.

As shown in each of the first through fifth numerical embodiments, the third lens group G3 is configured of a positive lens element 30, and a cemented lens 33 that is formed from a positive lens element 31 and a negative lens element 32, in that order from the object side. The positive lens element 30 is a biconvex positive lens element and has an aspherical surface on each side thereof. The positive lens element 31 is a positive meniscus lens element having a convex surface on the object side. The negative lens element 32 is a negative meniscus lens element having a convex surface on the object side.

As shown in each of the first through fifth numerical embodiments, the fourth lens group G4 is configured of a positive lens element 40 and a negative lens element 41, in that order from the object side. The positive lens element 40 is a biconvex positive lens element and has an aspherical surface on each side thereof. The negative lens element 41 is a negative meniscus lens element having a convex surface on the image side, and has an aspherical surface on the object side thereof (first through third numerical embodiments) or has an aspherical surface on each side thereof (fourth and fifth numerical embodiments).

In order to miniaturize a camera provided with a zoom lens system in a multi-stage retractable lens barrel, it is important to reduce the diameter of the first lens group G1 (frontmost lens group) that is provided closest to the object side and to reduce the overall length of the zoom lens system. There are also demands for the thickness of each lens group of the zoom lens system to be reduced. Furthermore, it is also necessary to simplify the mechanical structure for moving the lens groups during zooming. If the number of zoom lens groups are reduced, the mechanical structure therefor can be simplified, however, it is difficult to achieve a high zoom ratio. Generally, if the number of constituent lens elements in a lens system is reduced in order to miniaturize the lens system and reduce the thickness of each lens group, the degree of difficulty in correcting aberrations increases. In order to favorably correct various aberrations over the entire zooming range while achieving miniaturization of the lens system, it is necessary to determine an appropriate refractive power distribution for each lens group and an appropriate lens arrangement.

The high zoom-ratio zoom lens system of the present invention is a positive-lead zoom lens system configured of a positive lens group, a negative lens group, a positive lens group and a positive lens group, in that order from the object side. The high zoom-ratio zoom lens system of the present invention has the advantage of being able to achieve a higher zoom ratio compared to a negative-lead zoom lens system that is often employed in compact digital cameras. However, generally, in a positive-lead zoom lens system, if attempts are made to achieve a high zoom-ratio, the overall length of the zoom lens system becomes long; furthermore, if attempts are made to achieve a wider angle-of-view, the frontmost lens (lens group) easily becomes large in diameter. Hence, it has been an ongoing problem to achieve further miniaturization in the optical system (zoom lens system) in order to be used in a compact digital camera. To solve this problem, by arranging the zoom lens system of present invention so that, upon zooming from the short focal length extremity to the long focal length extremity, the first lens group G1 moves (advances) by a large amount, the degree of freedom in movement of the second and third lens groups G2 and G3 is increased, and the zoom burden on each lens group can be appropriately set. For example, if the first lens group G1 were to be a non-movable (stationary) lens group, the burden of zooming on the second lens group G2 would increase, resulting in the diameter of the first lens group G1 easily being enlarged.

Condition (1) specifies the ratio of the overall focal length of the zoom lens system at the long focal length extremity to the focal length of the first lens group G1 in order to achieve a high zoom-ratio zoom lens system that is suitable for use in a compact digital camera.

If the upper limit of condition (1) is exceeded, although advantageous for reducing the overall length of the zoom lens system at the long focal length extremity, the angle-of-view at the short focal length extremity becomes undesirably small (narrow).

If the lower limit of condition (1) is exceeded, the refractive power of the first lens group G1 becomes weak, and if attempts are made to achieve a high zoom ratio, the amount of movement of the first lens group G1 becomes too large, so that the overall length of the zoom lens system at the long focal length extremity becomes too large.

Condition (2) specifies a ratio of the magnification of the second lens group G2 with respect to an object at infinity at the long focal length extremity to the magnification of the second lens group G2 with respect to an object at infinity at the short focal length extremity, in order to optimize the zooming function of the second lens group G2, so that the zoom lens system can be miniaturized and a superior optical quality can be achieved.

If the upper limit of condition (2) is exceeded, since the zooming function of the second lens group G2 becomes large and the refractive power of the second lens group G2 becomes too large, the diameter of the first lens group G1 must be increased so that it becomes difficult to correct abaxial aberration at the short focal length extremity.

If the lower limit of condition (2) is exceeded, since the zooming function of the second lens group G2 becomes too small, if attempts are made to increase the zoom ratio of the zoom lens system, the amount of movement of the third lens group G3 during zooming must be increased, resulting in a large fluctuation in the f-number.

In each of the first through fifth numerical embodiments, the lens element that is provided closest to the object side within the third lens group G3 is a positive lens element having an aspherical surface on each side thereof, however, it is sufficient for this positive lens element to have an aspherical surface on at least one side thereof.

With respect to the above-described structure, condition (3) specifies the ratio of the focal length of the entire zoom lens system at the long focal length extremity to the focal length of the positive lens element that is provided closest to the object side within the third lens group G3, and hence, specifies the range of the refractive power of the positive lens element that is provided closest to the object side with in the third lens group G3.

If the upper limit of condition (3) is exceeded, it becomes difficult to correct aberrations over the entire zooming range, and it becomes difficult to cope with a high resolution.

If the lower limit of condition (3) is exceeded, this is undesirable since the refractive power of the entire third lens group G3 becomes weak, the amount of movement of the third lens group G3 increases during zooming and f-number fluctuation increases.

Condition (4) specifies the refractive index at the d-line of the lens element that is provided closest to the object side within the first lens group G1 in order to achieve further miniaturization of the first lens group G1.

If the lower limit of condition (4) is exceeded, the effective light-ray height increases mainly at the short focal length extremity, so that the zoom lens system becomes unsuitable for a compact digital camera that requires accommodation of the zoom lens system within reduced dimensions in the optical axis direction (to maintaining a slim design) in the fully-retracted state via a multi-stage barrel.

Condition (5) specifies the Abbe number with respect to the d-line of the lens element that is provided closest to the object side within the first lens group G1, and relates to the correction of chromatic aberration mainly at the long focal length extremity.

In a zoom lens system, it is necessary for chromatic aberration to be corrected up to a certain extent at each lens group; however, in a high zoom-ratio zoom lens system, chromatic aberration correction at the first lens group (frontmost lens group) G1 is particularly important. The chromatic aberration at each lens group is corrected by a combination of a positive lens element and a negative lens element, which have different dispersion rates. However, if the chromatic aberration correction at the first lens group G1 is insufficient, since the remaining chromatic aberration is magnified from the second lens group G2 rearwards, the image quality is significantly deteriorated, especially at the long focal length extremity.

Generally, a glass material having a small Abbe number with respect to the d-line tends to have a large partial dispersion ratio Pg_F (=(ng−nF)/(nF−nC)). If such a glass material is used for the lens element (first lens element (10)) that is provided closest to the object side within the first lens group G1, even if chromatic aberrations can be corrected from the F-line to the C-line by using an anomalous dispersive glass material for the lens elements from the second lens element rearwards within the first lens group G1, the chromatic aberration at the g-line becomes large. This phenomenon is particularly prominent in a zoom lens system having a zoom ratio of 15:1 or greater.

If the upper limit of condition (5) is exceeded, it becomes necessary to strengthen the refractive power of the first lens element 10 that is provided (closest to the object side) within the first lens group G1 in order to correct chromatic aberration, and accordingly, the thickness of the first lens group G1 in the optical axis direction and the diameter thereof increase. Furthermore, this results in an increase in size (in the optical axis direction) of the digital camera unit when in a fully-retracted state, which is unsuitable for a compact digital camera.

If the lower limit of condition (5) is exceeded, the remaining chromatic aberration at the g-line at the long focal length extremity increases.

Additionally, it is desirable for the partial dispersion ratio of the lens element that is provided closest to the object side within the first lens group G1 to satisfy the condition Pg_F<0.62.

The first lens group G1, as shown in each of the first through fifth numerical embodiments, is configured of a negative lens element (10), a positive lens element (11) and a positive lens element (12), in that order from the object side.

Condition (6), in view of the above-described arrangement of the first lens group G1, specifies the sum of the Abbe number with respect to the d-line of the positive lens element (11) that is provided on the object side within the first lens group G1 and the Abbe number with respect to the d-line of the positive lens element (12) that is provided on the image side within the first lens group G1, and relates to the correction of chromatic aberration by the first lens group G1.

If the lower limit of condition (6) is exceeded, a large amount of chromatic aberration undesirably occurs at the long focal length extremity of the high zoom-ratio zoom lens system.

Furthermore, it is desirable for the two positive lens elements (11 and 12) provided within the first lens group G1 to be formed from a glass material that has an anomalous dispersion in which the partial dispersion ratio satisfies the condition Pg_F<0.54.

As shown in each of the first through fifth numerical embodiments, the third lens group G3 includes two positive lens elements (30 and 31).

In view of this arrangement, condition (7) specifies the sum of the Abbe numbers with respect to the d-line of the two positive lens elements (30 and 31) that are provided within the third lens group G3, and relates to the correction of chromatic aberration by the third lens group G3.

If the lower limit of condition (7) is exceeded, the axial chromatic aberration from the short focal length extremity to the long focal length extremity cannot be sufficiently corrected, which is undesirable.

Furthermore, it is desirable for the two positive lens elements (30 and 31) that are provided in the third lens group G3 to be made from an anomalous dispersion glass material that has a partial dispersion ratio that satisfies the condition Pg_F<0.54.

As shown in each of the first through fifth numerical embodiments, the second lens group G2 includes a positive lens element (22) that has an aspherical surface on at least one side thereof.

In view of this arrangement, condition (8) specifies the Abbe number with respect to the d-line of the positive lens element (22) that is provided in the second lens group G2 and has an aspherical surface on at least one side thereof, and relates to the correction of chromatic aberration by the second lens group G2 and the miniaturization of the zoom lens system.

If the upper limit of condition (8) is exceeded, it becomes necessary to strengthen the refractive power of the positive lens element (22) in order to correct the chromatic aberration so that the thickness of the second lens group G2 in the optical axis direction increases, and hence, is undesirable for miniaturization of the zoom lens system since the diameter of the first lens group G1 also increases.

Furthermore, by forming this positive lens element (22) so as to have an aspherical surface on at least one side thereof, abaxial aberrations that occur during wide-angle zooming can be favorably corrected.

The fourth lens group G4 is a focusing lens group which is moved during a focusing operation. In each of the first through fifth embodiments, the fourth lens group G4 is configured of a positive lens element having an aspherical surface on each side, and a negative lens element having an aspherical surface on at least one side thereof, in that order from the object side; however, the positive lens element is only required to have an aspherical surface on at least one side thereof.

In view of this arrangement, condition (9) specifies the difference between the Abbe numbers with respect to the d-line of the positive lens element and the negative lens element that are provided within the fourth lens group G4. By satisfying condition (9), chromatic aberration fluctuations that occur due to the change in the object distance can be reduced.

By forming an aspherical surface on at least one side of each of the positive and negative lens elements that are provided in the fourth lens group G4, field curvature fluctuations during focusing on an object at infinity through to a close distance can be reduced.

Furthermore, by forming the positive and negative lens from resin, unwanted peripheral portions of these lens elements can be cut off by utilizing the difference in the light-ray effective diameters that occurs depending on the orientation of long sides of the imaging surface; hence, the accommodation space for the fourth lens group G4 can be effectively utilized. Although it is not impossible to cut off peripheral portions of the (positive and negative) glass lens elements, such a cutting process is very difficult and expensive. Whereas if such lens elements are formed from resin, it is easy to form such lens elements by cutting off peripheral portions thereof.

EMBODIMENTS

Specific numerical embodiments will be herein discussed. The following numerical embodiments correspond to a zoom lens system used in a digital compact camera. In the aberration diagrams and the tables, the d-line, g-line and C-line show aberrations at their respective wave-lengths; S designates the sagittal image, M designates the meridional image, Fno. designates the f-number, f designates the focal length of the entire optical system, W designates the half angle of view (°), Y designates the image height, fB designates the backfocus, L designates the overall length of the lens system, r designates the radius of curvature, d designates the lens thickness or distance between lenses, N(d) designates the refractive index at the d-line, and vd designates the Abbe number with respect to the d-line. The values for the f-number, the focal length, the half angle-of-view, the image height, the backfocus, the overall length of the lens system, and the distance between lenses (which changes during zooming and according to the overall length of the lens system) are shown in the following order: short focal length extremity, intermediate focal length, and long focal length extremity.

An aspherical surface which is rotationally symmetrical about the optical axis is defined as:

$$x=cy^2/(1+[1+-\{1+K\}c^2y^2]^{1/2})+A4y^4+A6y^6+A8y^8+A10y^{10}+A12y^{12}$$

wherein 'x' designates a distance from a tangent plane of the aspherical vertex, 'c' designates the curvature (1/r) of the aspherical vertex, 'y' designates the distance from the optical axis, 'K' designates the conic coefficient, A4 designates a fourth-order aspherical coefficient, A6 designates a sixth-order aspherical coefficient, A8 designates an eighth-order aspherical coefficient, A10 designates a tenth-order aspherical coefficient, and A12 designates a twelfth-order aspherical coefficient.

Embodiment 1

Figure 1:
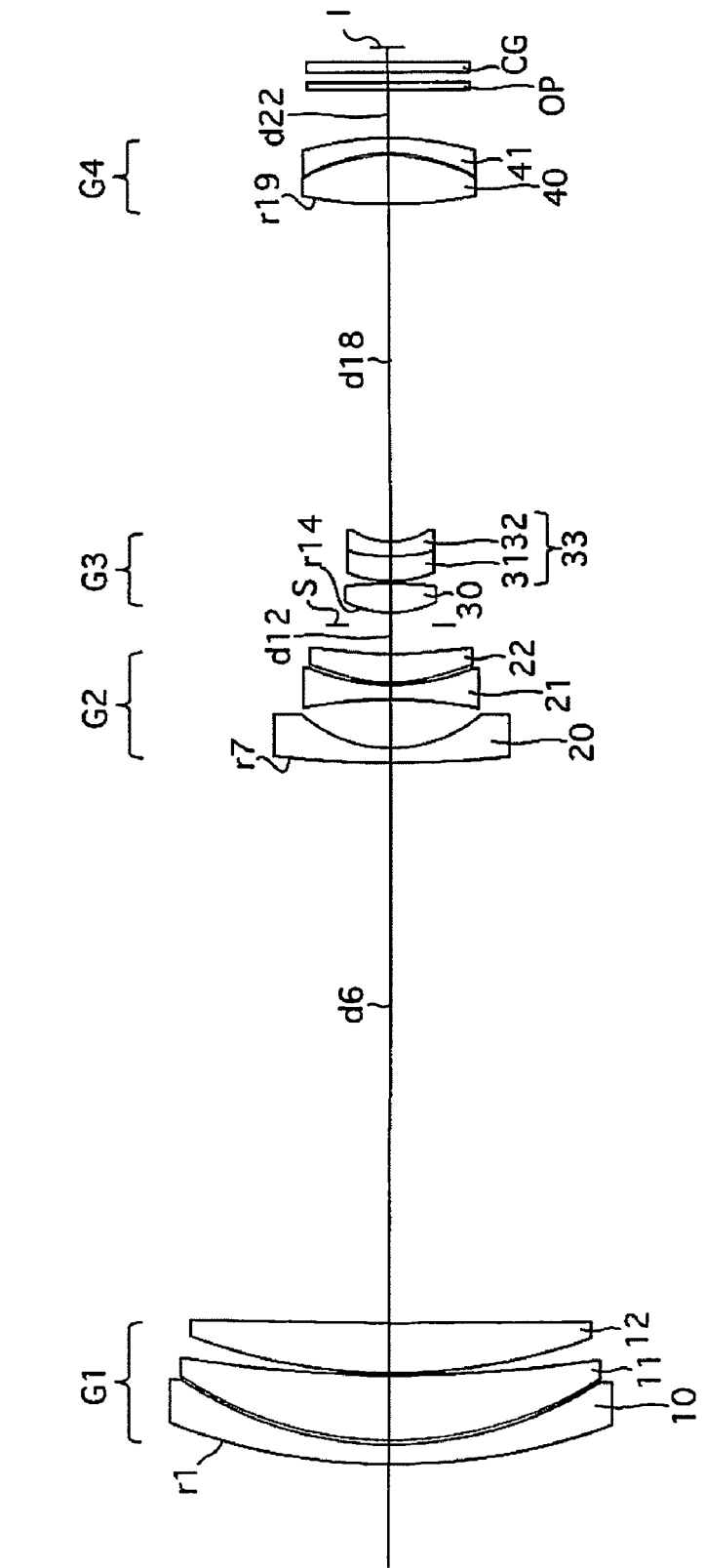
FIG. 1 shows a lens arrangement of a first numerical embodiment of the high zoom-ratio zoom lens system, according to the present invention, at the long focal length extremity when focused on an object at infinity.
Figure 2:
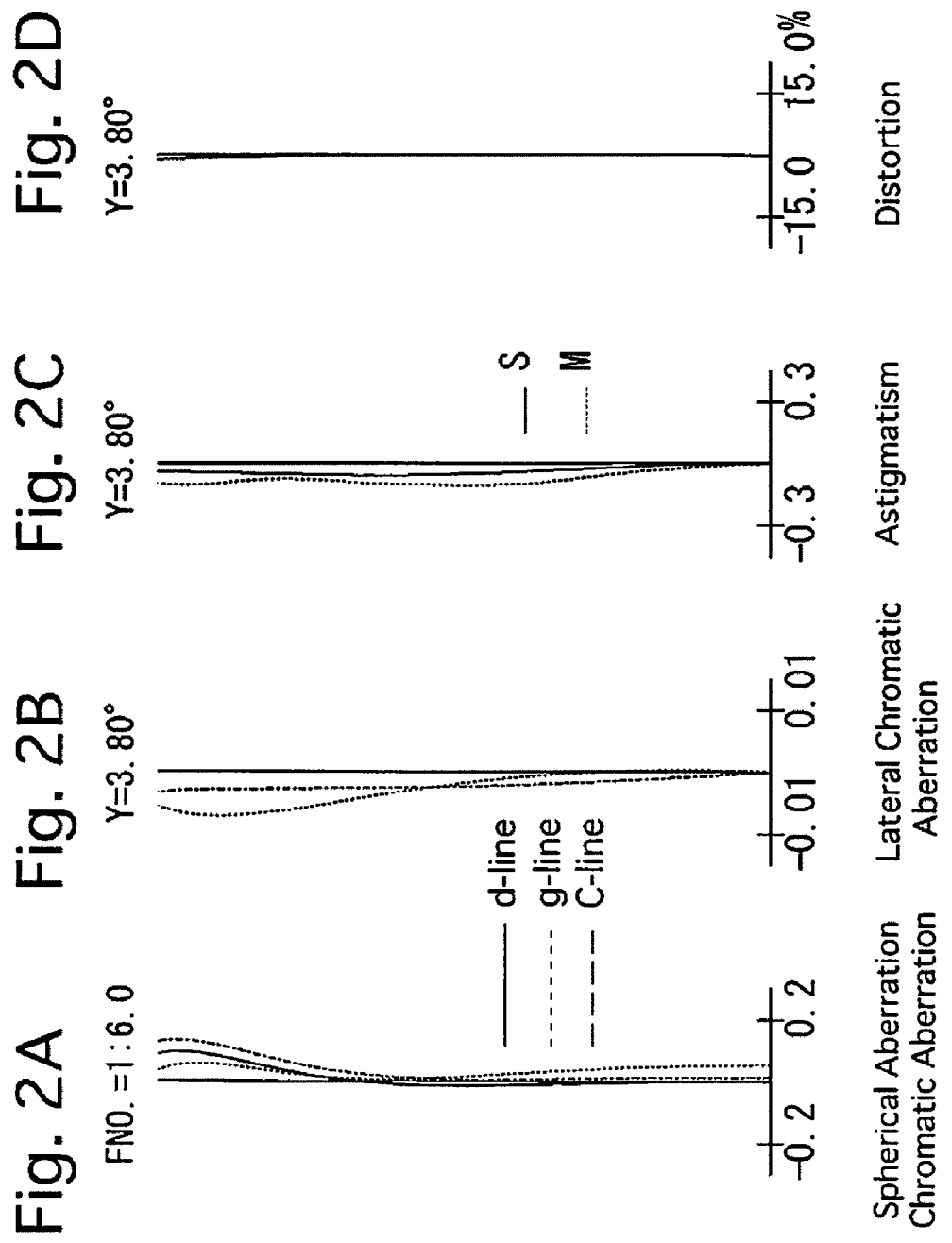
FIGS. 2A, 2B, 2C and 2D show various aberrations that occurred in the lens arrangement shown in FIG. 1.
Figure 3:
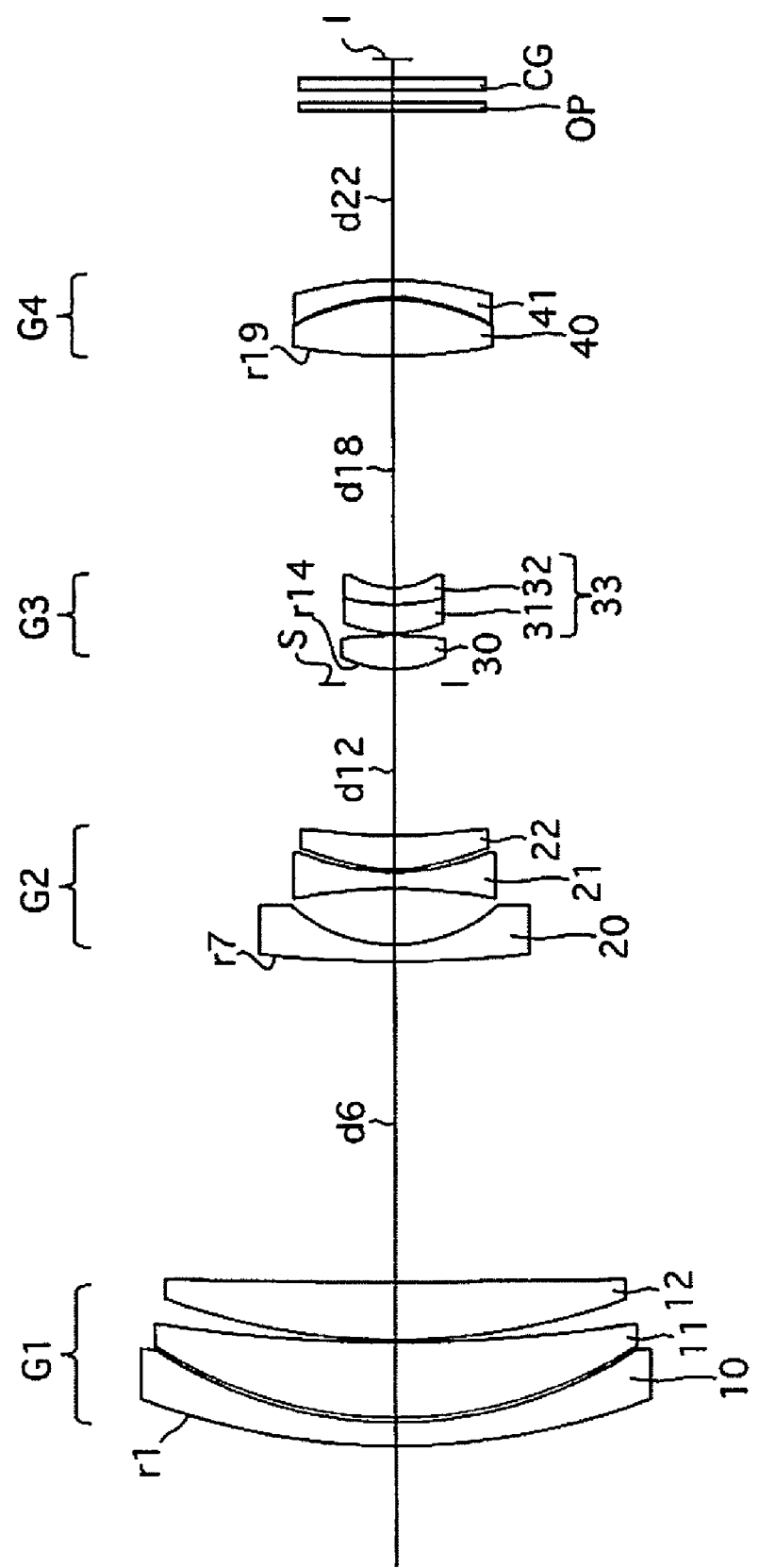
FIG. 3 shows a lens arrangement of the first numerical embodiment of the high zoom-ratio zoom lens system at an intermediate focal length when focused on an object at infinity.
Figure 4:
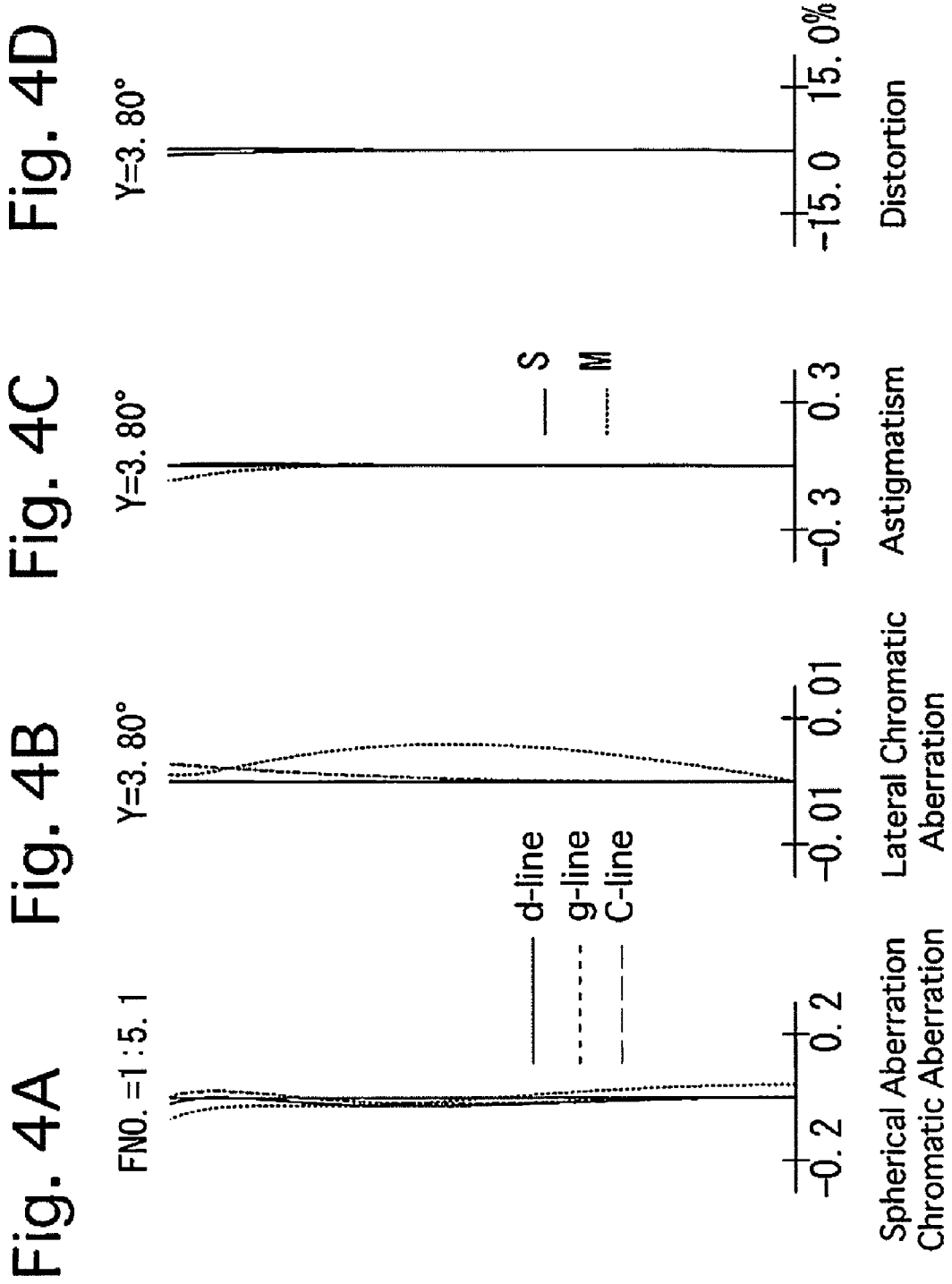
FIGS. 4A, 4B, 4C and 4D show various aberrations that occurred in the lens arrangement shown in FIG. 3.
Figure 5:
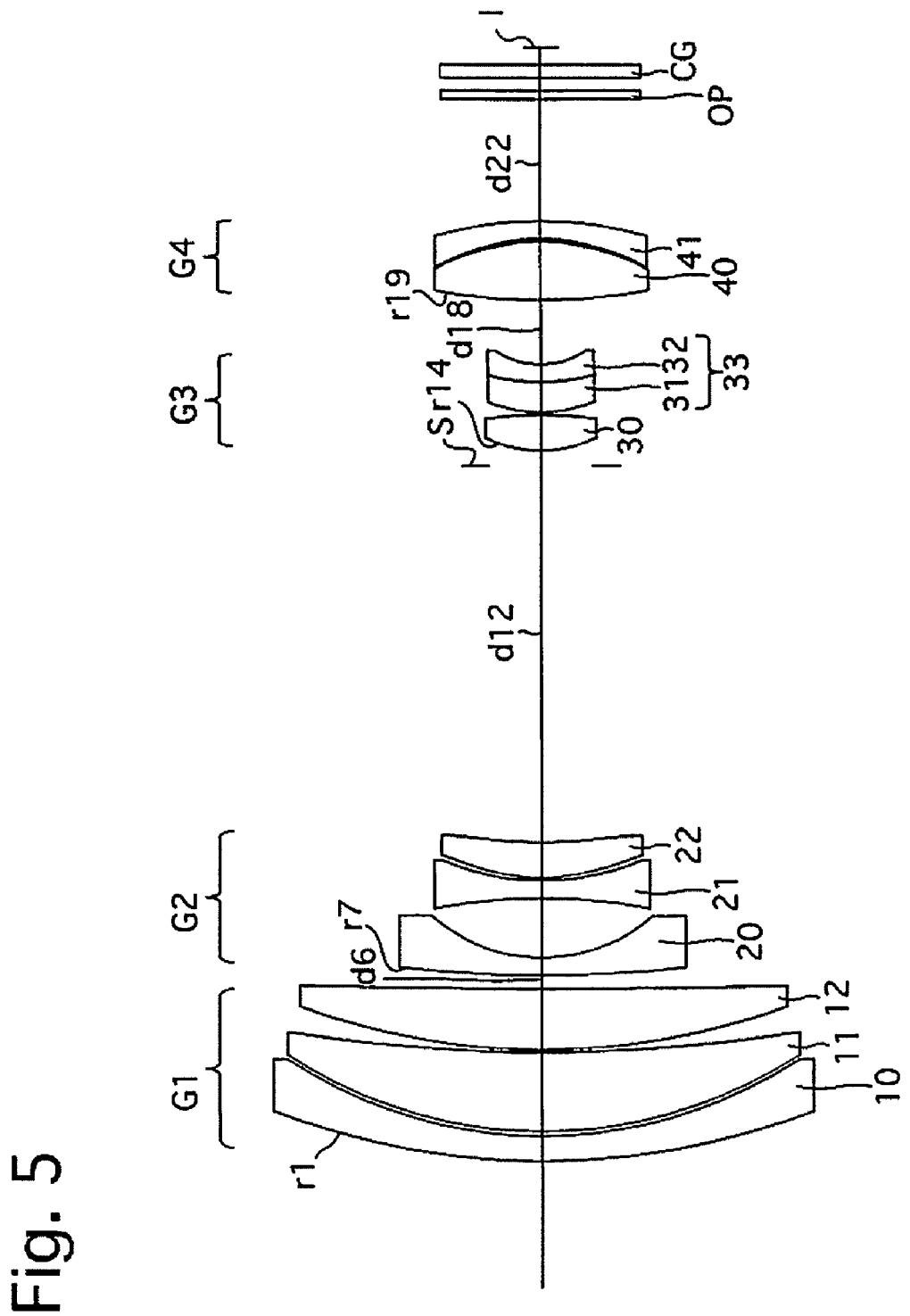
FIG. 5 shows a lens arrangement of the first numerical embodiment of the high zoom-ratio zoom lens system at the short focal length extremity when focused on an object at infinity.
Figure 6:
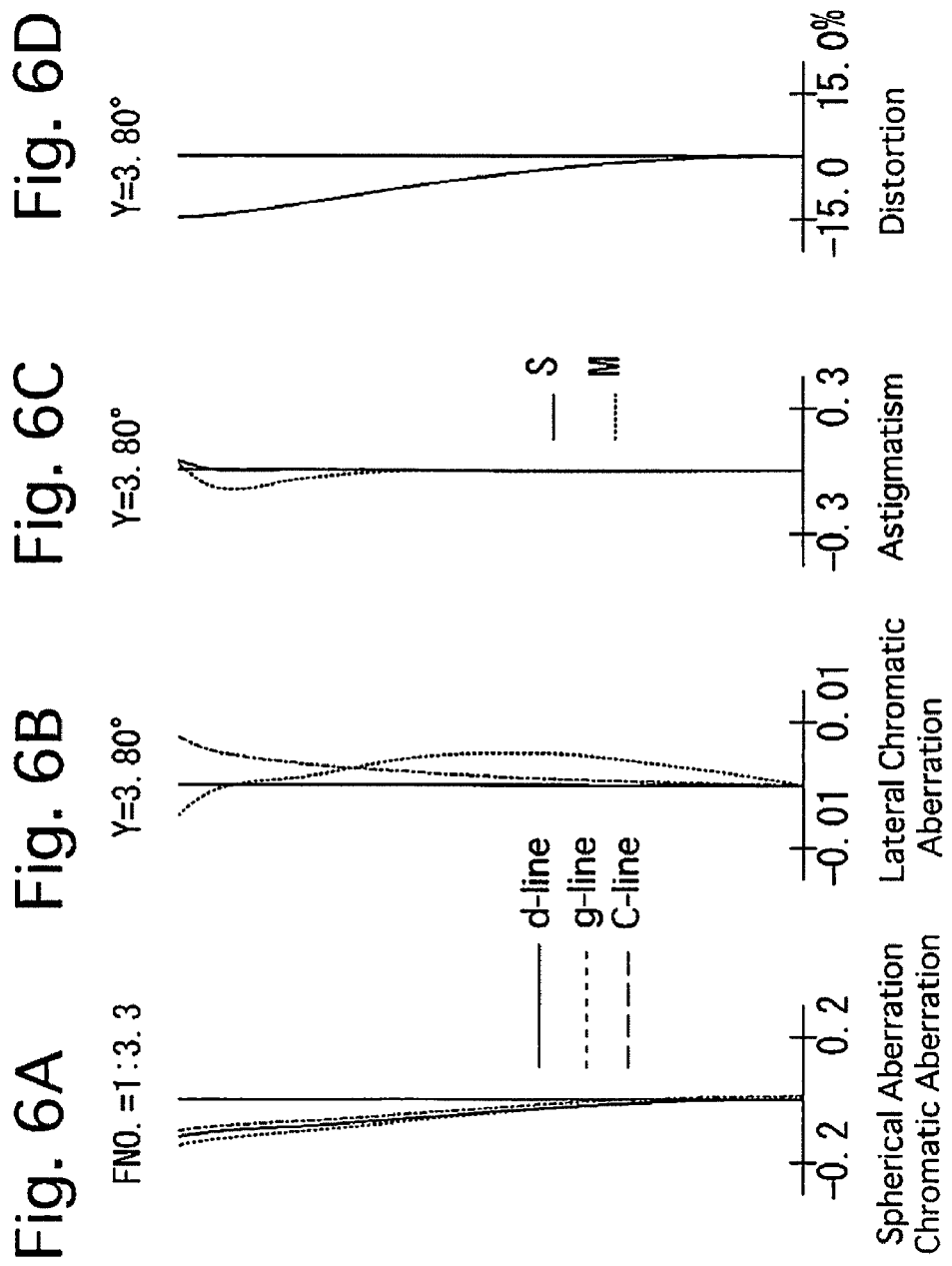
FIGS. 6A, 6B, 6C and 6D show various aberrations that occurred in the lens arrangement shown in FIG. 5.

FIGS. 1 through 6D and Tables 1 through 4 illustrate a first numerical embodiment of a zoom lens system according to the present invention. FIG. 1 shows a lens arrangement of the first numerical embodiment of the high zoom-ratio zoom lens system at the long focal length extremity when focused on an object at infinity. FIGS. 2A, 2B, 2C and 2D show various aberrations that occurred in the lens arrangement shown in FIG. 1. FIG. 3 shows a lens arrangement of the first numerical embodiment of the high zoom-ratio zoom lens system at an intermediate focal length when focused on an object at infinity. FIGS. 4A, 4B, 4C and 4D show various aberrations that occurred in the lens arrangement shown in FIG. 3. FIG. 5 shows a lens arrangement of the first numerical embodiment of the high zoom-ratio zoom lens system at the short focal length extremity when focused on an object at infinity. FIGS. 6A, 6B, 6C and 6D show various aberrations that occurred in the lens arrangement shown in FIG. 5. Table 1 shows the lens surface data, Table 2 shows various zoom lens system data, Table 3 shows the aspherical surface data, and Table 4 shows the lens group data.

The high zoom-ratio zoom lens system of the first numerical embodiment is configured of a positive first lens group G1, a negative second lens group G2, a positive third lens group G3 and a positive fourth lens group G4, in that order from the object side.

The first lens group G1 (surface Nos. 1 through 6) is configured of a negative meniscus lens element 10 having a convex surface on the object side, a positive meniscus lens element 11 having a convex surface on the object side, and a positive meniscus lens element 12 having a convex surface on the object side, in that order from the object side.

The second lens group G2 (surface Nos. 7 through 12) is configured of a negative meniscus lens element 20 having a convex surface on the object side, a biconcave negative lens element 21 and a positive meniscus lens element 22 having a convex surface on the object side, in that order from the object side. The positive meniscus lens element 22 has an aspherical surface formed on each side thereof.

The third lens group G3 (surface Nos. 14 through 18) is configured of a biconvex positive lens element 30, and a cemented lens 33 that is formed from a positive meniscus lens element 31 having a convex surface on the object side and a negative meniscus lens element 32 having a convex surface on the object side, in that order from the object side. The biconvex positive lens element 30 has an aspherical surface formed on each side thereof. A diaphragm S (surface No. 13) which is provided between the second lens group G2 and the third lens group G3 moves integrally with the third lens group G3 during zooming.

The fourth lens group G4 (surface Nos. 19 through 22) is configured of a biconvex positive lens element 40 and a negative meniscus lens element 41 having a convex surface on the image side, in that order from the object side. The biconvex positive lens element 40 has an aspherical surface on each side thereof. The negative meniscus lens element 41 has an aspherical surface on the object side thereof. An optical filter OP (surface Nos. 23 and 24) and a cover glass CG (surface Nos. 25 and 26) are provided behind the fourth lens group G4 (negative meniscus lens element 41), i.e., between the fourth lens group G4 and the imaging plane I.

TABLE 1

LENS SURFACE DATA

| Surf. No. | r | d | N(d) | νd |
|---|---|---|---|---|
| 1 | 30.448 | 1.000 | 1.90366 | 31.3 |
| 2 | 18.804 | 0.170 | | |
| 3 | 18.873 | 3.131 | 1.59282 | 68.6 |
| 4 | 65.680 | 0.100 | | |
| 5 | 28.739 | 2.406 | 1.59282 | 68.6 |
| 6 | 399.600 | d6 | | |
| 7 | 52.632 | 0.700 | 1.83481 | 42.7 |
| 8 | 6.772 | 2.343 | | |
| 9 | −22.790 | 0.700 | 1.77250 | 49.6 |
| 10 | 10.291 | 0.100 | | |
| 11* | 7.494 | 1.400 | 2.00178 | 19.3 |
| 12* | 17.158 | d12 | | |
| 13 (Diaphragm) | ∞ | 0.600 | | |
| 14* | 4.893 | 1.420 | 1.55332 | 71.7 |
| 15* | −15.359 | 0.100 | | |
| 16 | 5.483 | 1.200 | 1.49700 | 81.6 |
| 17 | 8.348 | 0.700 | 1.90366 | 31.3 |
| 18 | 3.358 | d18 | | |
| 19* | 30.823 | 2.333 | 1.54358 | 55.7 |
| 20* | −7.032 | 0.100 | | |
| 21* | −7.115 | 0.700 | 1.60641 | 27.2 |
| 22 | −15.392 | d22 | | |
| 23 | ∞ | 0.350 | 1.51680 | 64.2 |
| 24 | ∞ | 0.510 | | |
| 25 | ∞ | 0.500 | 1.51680 | 64.2 |
| 26 | ∞ | — | | |

The asterisk (*) designates an aspherical surface which is rotationally symmetrical with respect to the optical axis.

TABLE 2

ZOOM LENS SYSTEM DATA
Zoom Ratio 14.60

| | Short Focal Length Extremity | Intermediate Focal Length | Long Focal Length Extremity |
|---|---|---|---|
| FNO. | 3.3 | 5.1 | 6.0 |
| F | 5.00 | 18.00 | 73.01 |
| W | 41.7 | 12.1 | 3.0 |
| Y | 3.80 | 3.80 | 3.80 |
| fB | 0.59 | 0.59 | 0.59 |
| L | 43.87 | 57.69 | 68.00 |
| d6 | 0.535 | 13.381 | 26.958 |
| d12 | 14.878 | 6.389 | 1.400 |
| d18 | 2.529 | 9.724 | 16.189 |
| d22 | 4.775 | 7.046 | 2.300 |

TABLE 3

ASPHERICAL SURFACE DATA (aspherical surface coefficients not indicated are zero (0.00)):

| Surf. No. | K | A4 | A6 | A8 | A10 |
|---|---|---|---|---|---|
| 11 | 0.000 | $-0.6065 \times 10^{-3}$ | $-0.2753 \times 10^{-4}$ | $-0.5901 \times 10^{-7}$ | |
| 12 | 0.000 | $-0.3782 \times 10^{-3}$ | $-0.2572 \times 10^{-4}$ | $0.1966 \times 10^{-6}$ | |
| 14 | −1.000 | $-0.8997 \times 10^{-5}$ | $0.5688 \times 10^{-4}$ | $-0.6206 \times 10^{-5}$ | |
| 15 | 0.000 | $0.2937 \times 10^{-3}$ | $0.7356 \times 10^{-4}$ | $-0.9332 \times 10^{-5}$ | |
| 19 | 0.000 | $0.7061 \times 10^{-3}$ | $-0.4537 \times 10^{-4}$ | $0.1318 \times 10^{-5}$ | |
| 20 | 0.000 | $0.1846 \times 10^{-2}$ | $-0.2539 \times 10^{-4}$ | $-0.1967 \times 10^{-5}$ | $0.3466 \times 10^{-7}$ |
| 21 | 0.000 | $0.1200 \times 10^{-2}$ | $0.7061 \times 10^{-5}$ | $-0.1840 \times 10^{-5}$ | |

TABLE 4

| LENS GROUP DATA | | |
| --- | --- | --- |
| Lens Group | 1$^{st}$ Surf. | Focal Length |
| 1 | 1 | 43.18 |
| 2 | 7 | −6.69 |
| 3 | 14 | 10.37 |
| 4 | 19 | 20.62 |

Embodiment 2

Figure 7:
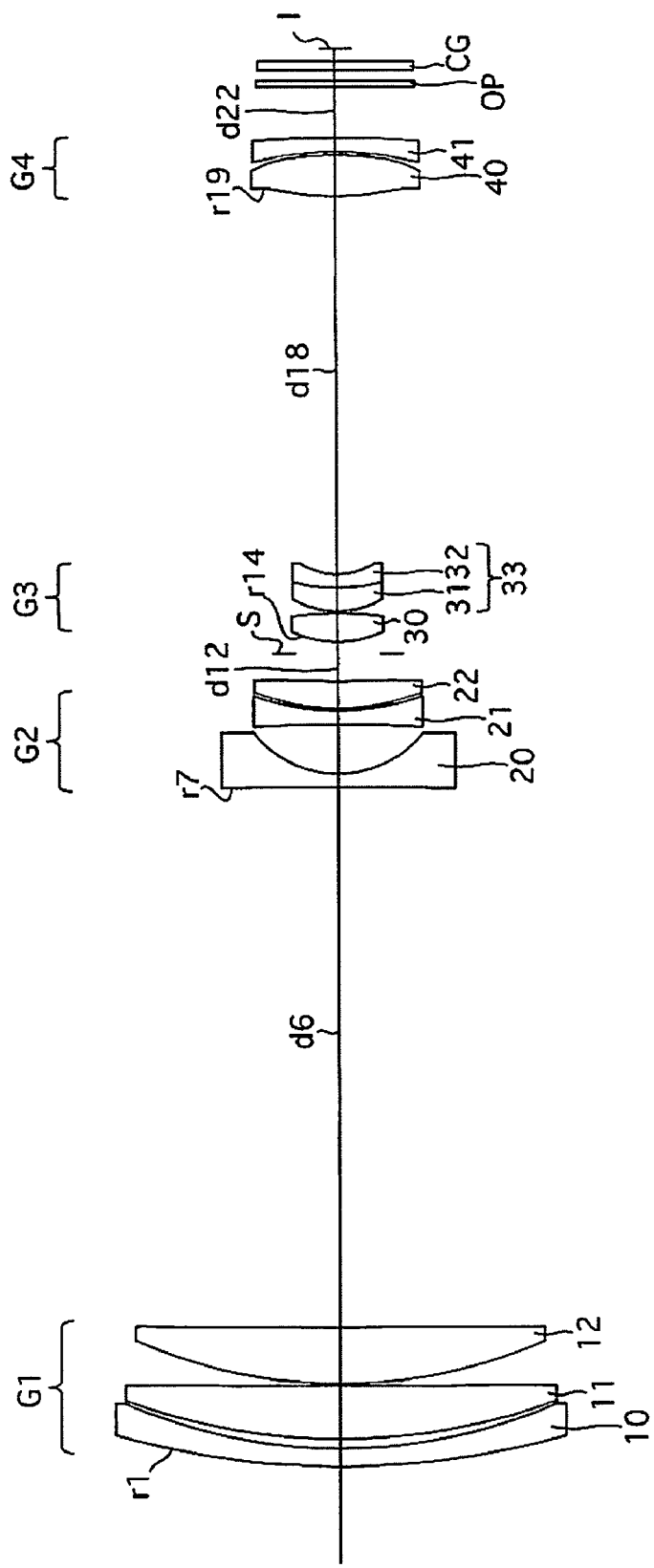
FIG. 7 shows a lens arrangement of a second numerical embodiment of the high zoom-ratio zoom lens system, according to the present invention, at the long focal length extremity when focused on an object at infinity.
Figure 8:
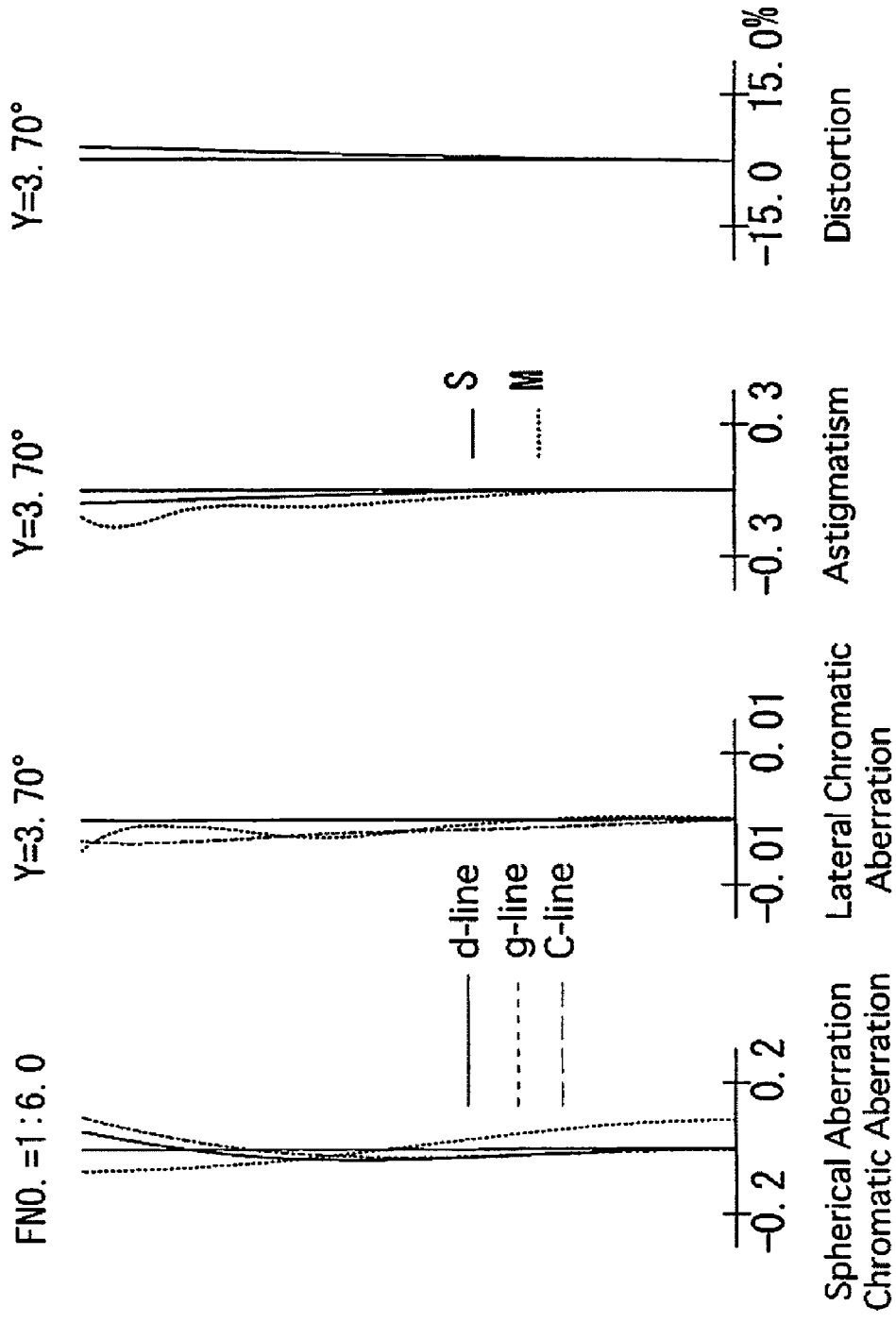
FIGS. 8A, 8B, 8C and 8D show various aberrations that occurred in the lens arrangement shown in FIG. 7.
Figure 9:
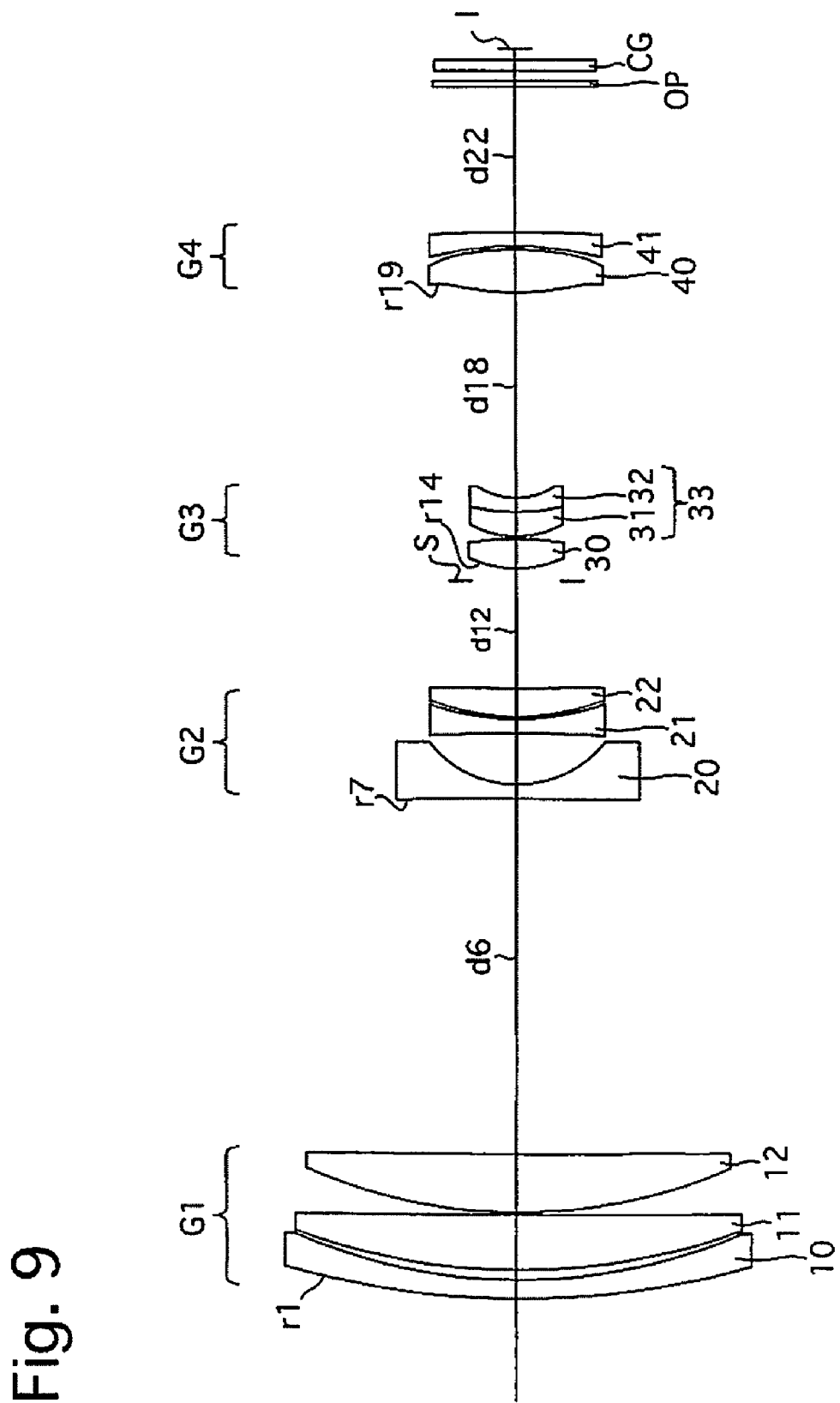
FIG. 9 shows a lens arrangement of the second numerical embodiment of the high zoom-ratio zoom lens system at an intermediate focal length when focused on an object at infinity.
Figure 10:
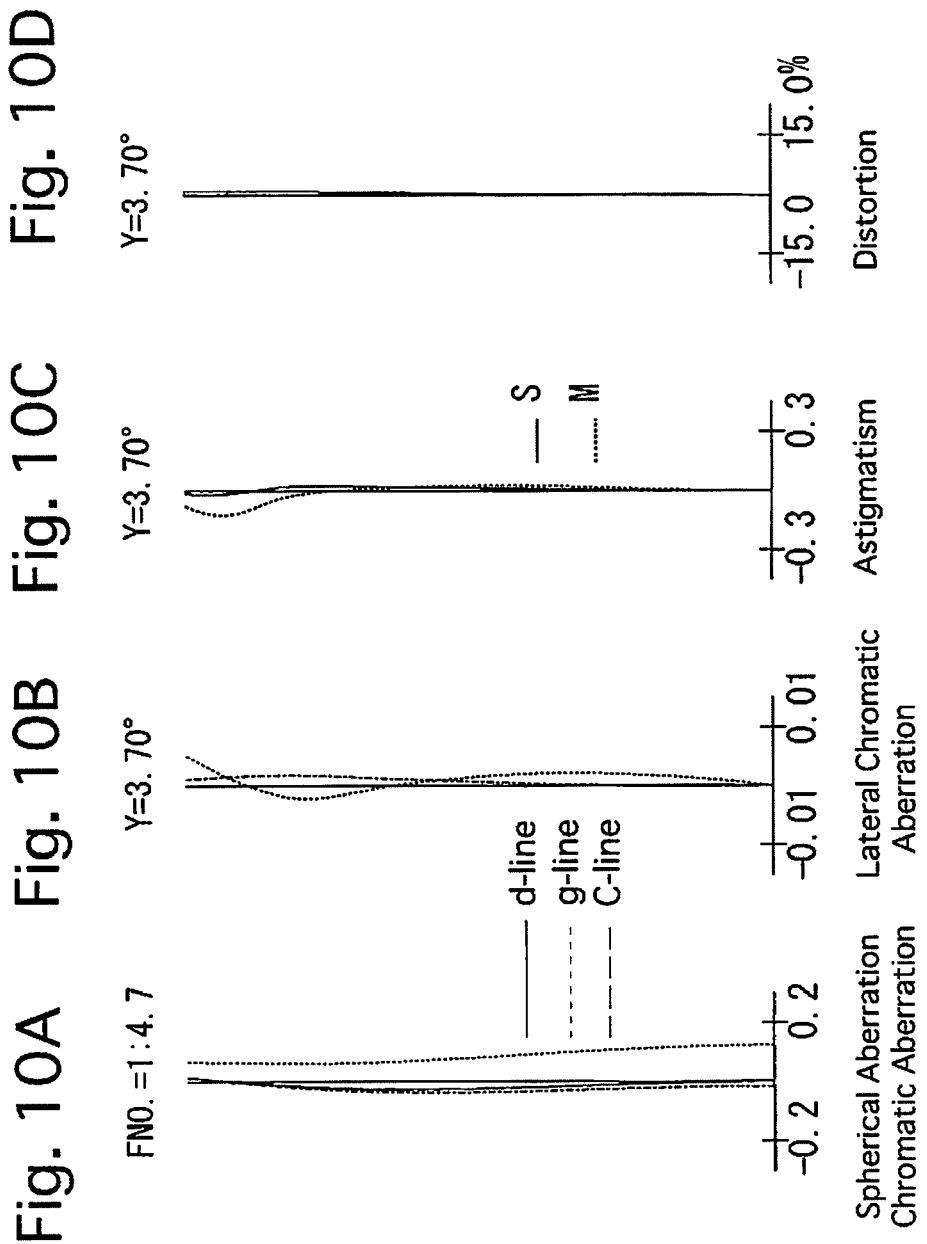
FIGS. 10A, 10B, 10C and 10D show various aberrations that occurred in the lens arrangement shown in FIG. 9.
Figure 11:
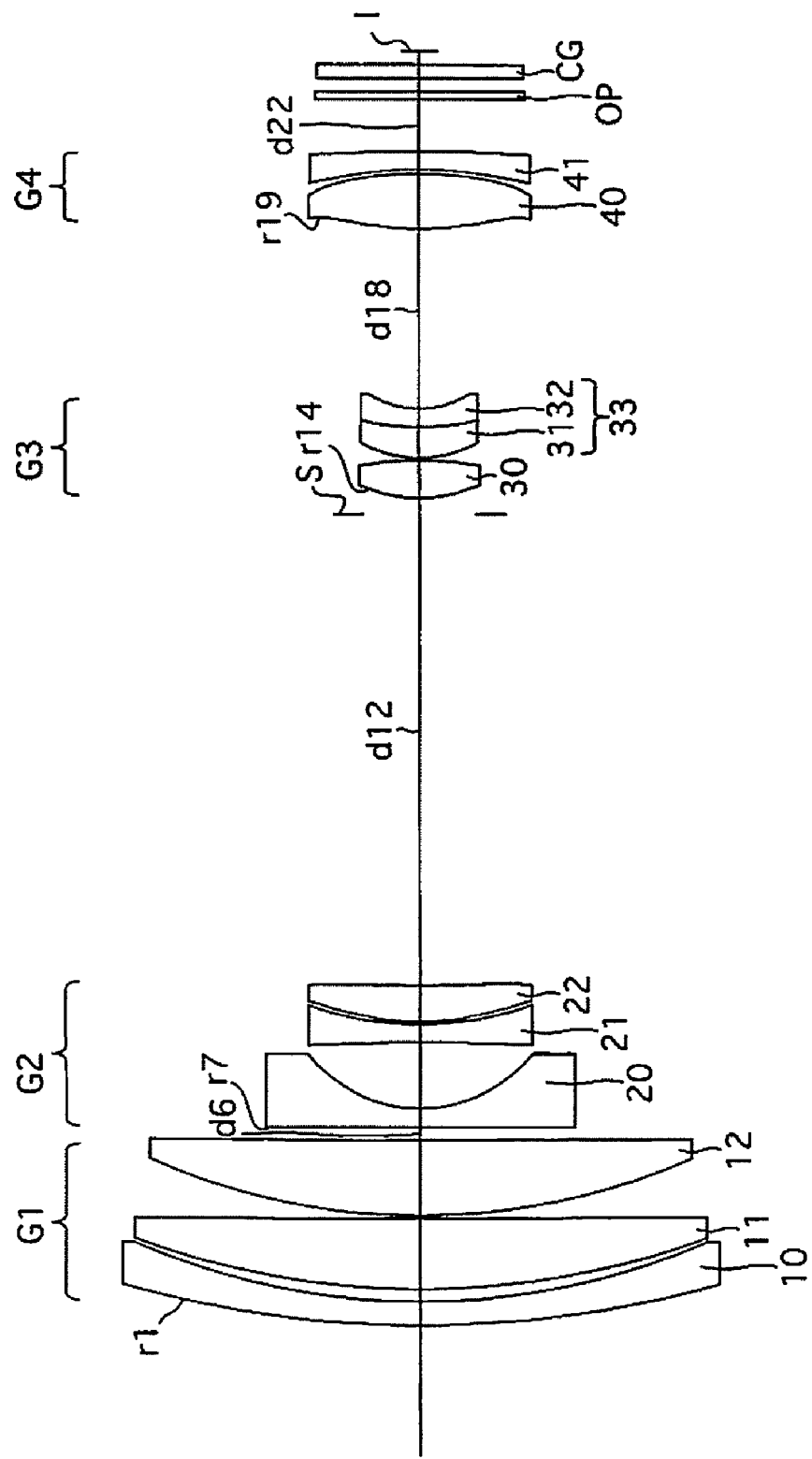
FIG. 11 shows a lens arrangement of the second numerical embodiment of the high zoom-ratio zoom lens system at the short focal length extremity when focused on an object at infinity.
Figure 12:
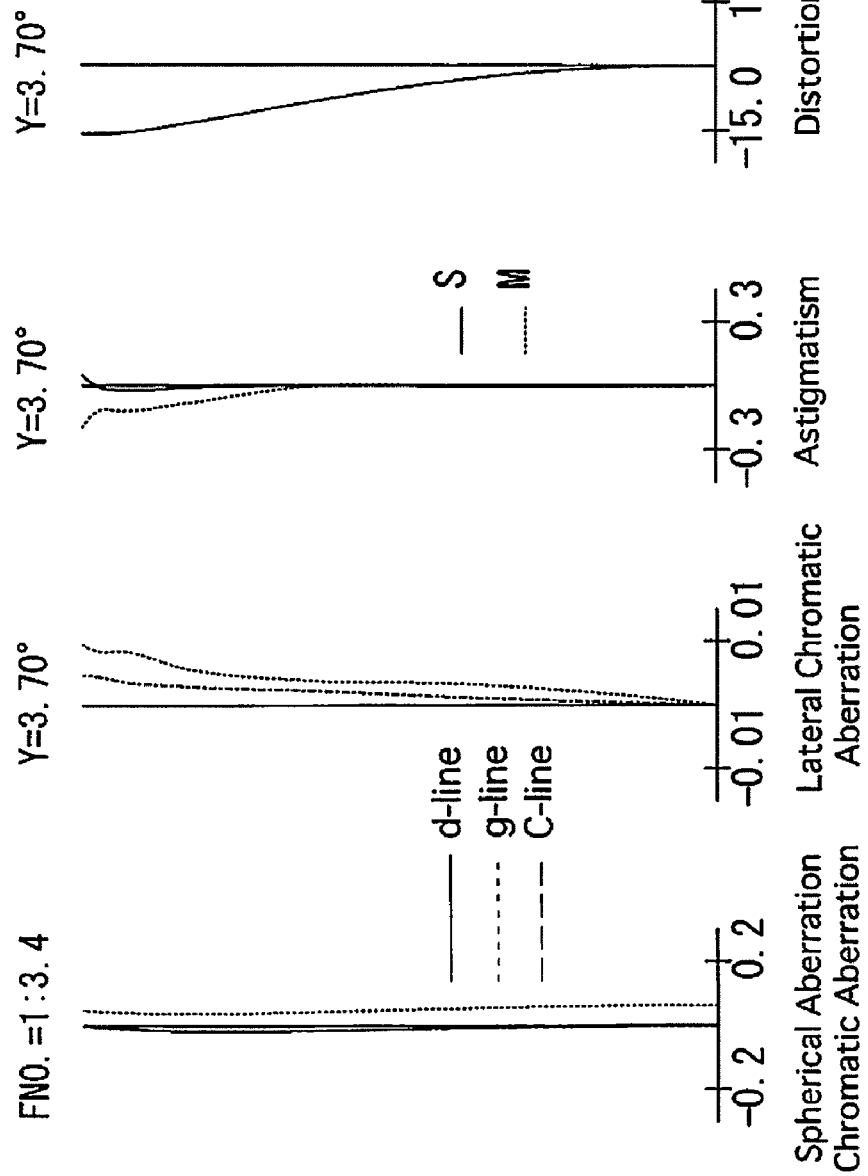
FIGS. 12A, 12B, 12C and 12D show various aberrations that occurred in the lens arrangement shown in FIG. 11.

FIGS. 7 through 12D and Tables 5 through 8 show the second numerical embodiment of the high zoom-ratio zoom lens system according to the present invention. FIG. 7 shows a lens arrangement of a second numerical embodiment of the high zoom-ratio zoom lens system, according to the present invention, at the long focal length extremity when focused on an object at infinity. FIGS. 8A, 8B, 8C and 8D show various aberrations that occurred in the lens arrangement shown in FIG. 7. FIG. 9 shows a lens arrangement of the second numerical embodiment of the high zoom-ratio zoom lens system at an intermediate focal length when focused on an object at infinity. FIGS. 10A, 10B, 10C and 10D show various aberrations that occurred in the lens arrangement shown in FIG. 9. FIG. 11 shows a lens arrangement of the second numerical embodiment of the high zoom-ratio zoom lens system at the short focal length extremity when focused on an object at infinity. FIGS. 12A, 12B, 12C and 12D show various aberrations that occurred in the lens arrangement shown in FIG. 11. Table 5 shows the lens surface data, Table 6 shows various zoom lens system data, Table 7 shows the aspherical surface data, and Table 8 shows the lens group data.

The lens arrangement of the second numerical embodiment is the same as that of the first numerical embodiment except for the negative lens element 20 of the second lens group G2 being a biconcave negative lens element.

TABLE 5

| LENS SURFACE DATA | | | | |
| --- | --- | --- | --- | --- |
| Surf. No. | r | d | N (d) | vd |
| 1 | 43.353 | 0.900 | 2.00100 | 29.1 |
| 2 | 28.082 | 0.489 | | |
| 3 | 32.490 | 2.706 | 1.45860 | 90.2 |
| 4 | 1227.295 | 0.100 | | |
| 5 | 26.299 | 2.897 | 1.59282 | 68.6 |
| 6 | 1000.000 | d6 | | |
| 7 | −1000.000 | 0.700 | 1.88300 | 40.8 |
| 8 | 5.657 | 2.524 | | |
| 9 | −84.832 | 0.700 | 1.77250 | 49.6 |
| 10 | 13.108 | 0.100 | | |
| 11* | 10.789 | 1.400 | 2.00178 | 19.3 |
| 12* | 53.499 | d12 | | |
| 13 (Diaphragm) | ∞ | 0.600 | | |
| 14* | 5.451 | 1.450 | 1.49700 | 81.6 |
| 15* | −13.861 | 0.100 | | |
| 16 | 4.640 | 1.200 | 1.48749 | 70.4 |
| 17 | 9.555 | 0.700 | 1.90366 | 31.3 |
| 18 | 3.586 | d18 | | |
| 19* | 13.000 | 2.100 | 1.54358 | 55.7 |
| 20* | −13.279 | 0.150 | | |
| 21* | −13.465 | 0.700 | 1.63550 | 23.9 |
| 22 | −71.694 | d22 | | |
| 23 | ∞ | 0.300 | 1.51680 | 64.2 |
| 24 | ∞ | 0.510 | | |
| 25 | ∞ | 0.500 | 1.51680 | 64.2 |
| 26 | ∞ | — | | |

The asterisk (*) designates an aspherical surface which is rotationally symmetrical with respect to the optical axis.

TABLE 6

| ZOOM LENS SYSTEM DATA | | | |
| --- | --- | --- | --- |
| Zoom Ratio 14.51 | | | |
| | Short Focal Length Extremity | Intermediate Focal Length | Long Focal Length Extremity |
| FNO. | 3.4 | 4.7 | 6.0 |
| F | 4.40 | 20.00 | 63.85 |
| W | 45.0 | 10.4 | 3.2 |
| Y | 3.70 | 3.70 | 3.70 |
| fB | 0.59 | 0.59 | 0.59 |
| L | 48.95 | 61.31 | 72.00 |
| d6 | 0.500 | 17.457 | 27.459 |
| d12 | 18.141 | 5.316 | 1.400 |
| d18 | 6.897 | 10.040 | 19.125 |
| d22 | 2.000 | 7.080 | 2.600 |

TABLE 7

ASPHERICAL SURFACE DATA
(aspherical surface coefficients not indicated are zero (0.00)):

| Surf. No. | K | A4 | A6 | A8 | A10 |
| --- | --- | --- | --- | --- | --- |
| 11 | 0.000 | $-0.9062 \times 10^{-4}$ | $-0.1928 \times 10^{-4}$ | $0.3931 \times 10^{-6}$ | |
| 12 | 0.000 | $-0.2131 \times 10^{-3}$ | $-0.1764 \times 10^{-4}$ | $0.2624 \times 10^{-6}$ | |
| 14 | −1.000 | $-0.7100 \times 10^{-4}$ | $0.3833 \times 10^{-4}$ | $0.6951 \times 10^{-6}$ | |
| 15 | 0.000 | $0.1852 \times 10^{-3}$ | $0.5591 \times 10^{-4}$ | $-0.8447 \times 10^{-6}$ | |
| 19 | 0.000 | $-0.2234 \times 10^{-3}$ | $0.1335 \times 10^{-4}$ | $-0.3000 \times 10^{-5}$ | |
| 20 | 0.000 | $0.2386 \times 10^{-2}$ | $-0.2275 \times 10^{-3}$ | $0.4424 \times 10^{-5}$ | $0.6688 \times 10^{-8}$ |
| 21 | 0.000 | $0.2303 \times 10^{-2}$ | $-0.2053 \times 10^{-3}$ | $0.6248 \times 10^{-5}$ | |

TABLE 8

LENS GROUP DATA

| Lens Group | 1st Surf. | Focal Length |
|---|---|---|
| 1 | 1 | 42.93 |
| 2 | 7 | −6.80 |
| 3 | 14 | 11.02 |
| 4 | 19 | 22.43 |

Embodiment 3

Figure 13:
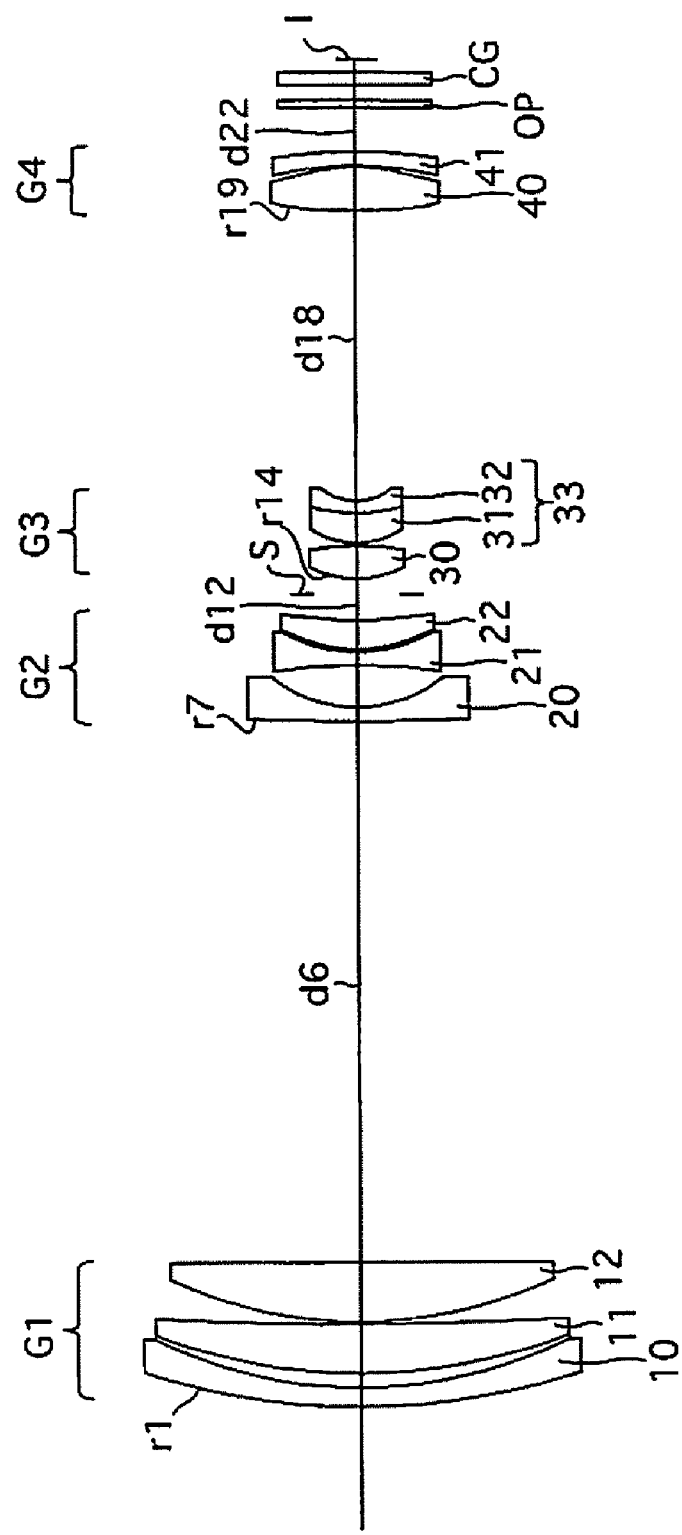
FIG. 13 shows a lens arrangement of a third numerical embodiment of the high zoom-ratio zoom lens system, according to the present invention, at the long focal length extremity when focused on an object at infinity.
Figure 14:
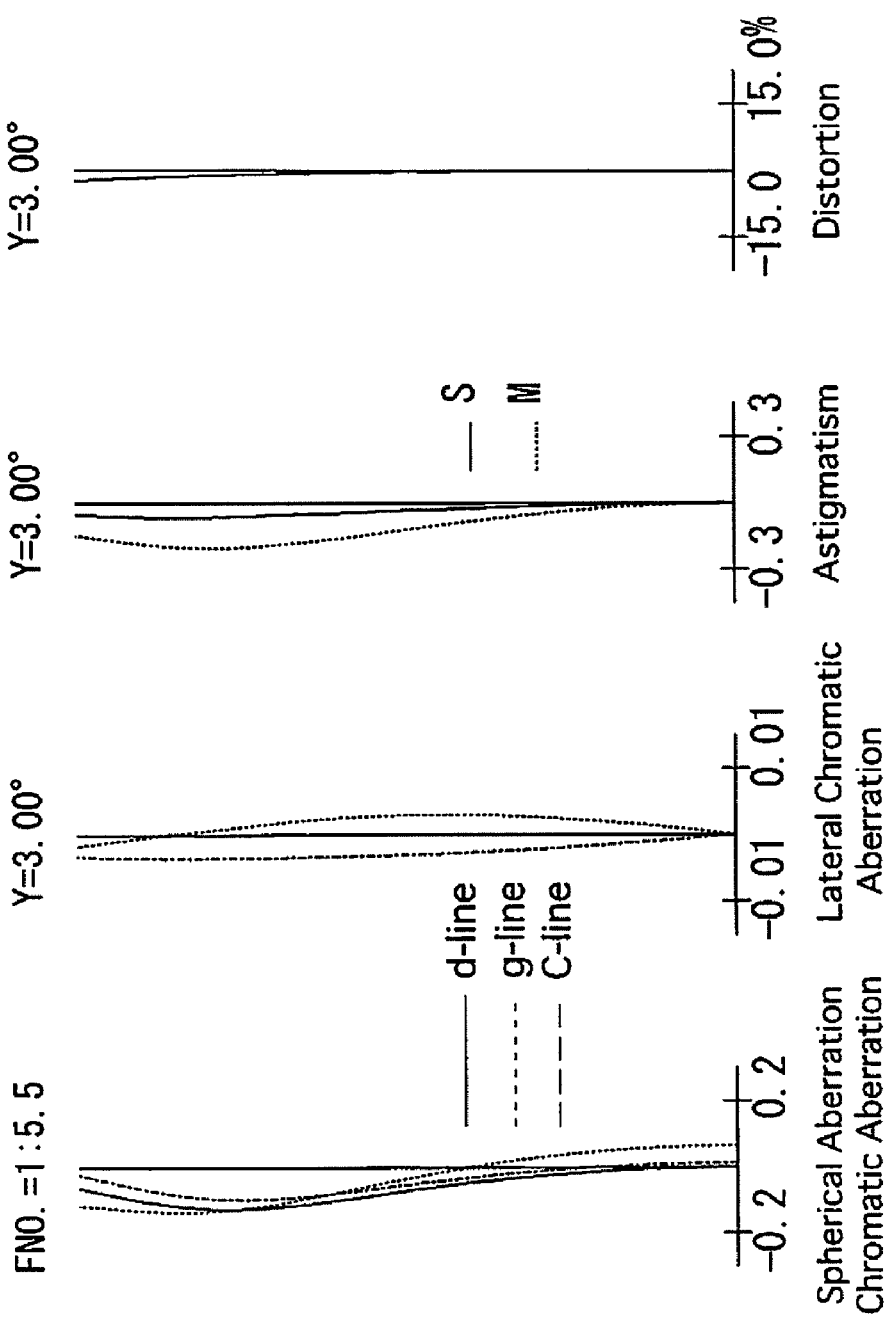
FIGS. 14A, 14B, 14C and 14D show various aberrations that occurred in the lens arrangement shown in FIG. 13.
Figure 15:
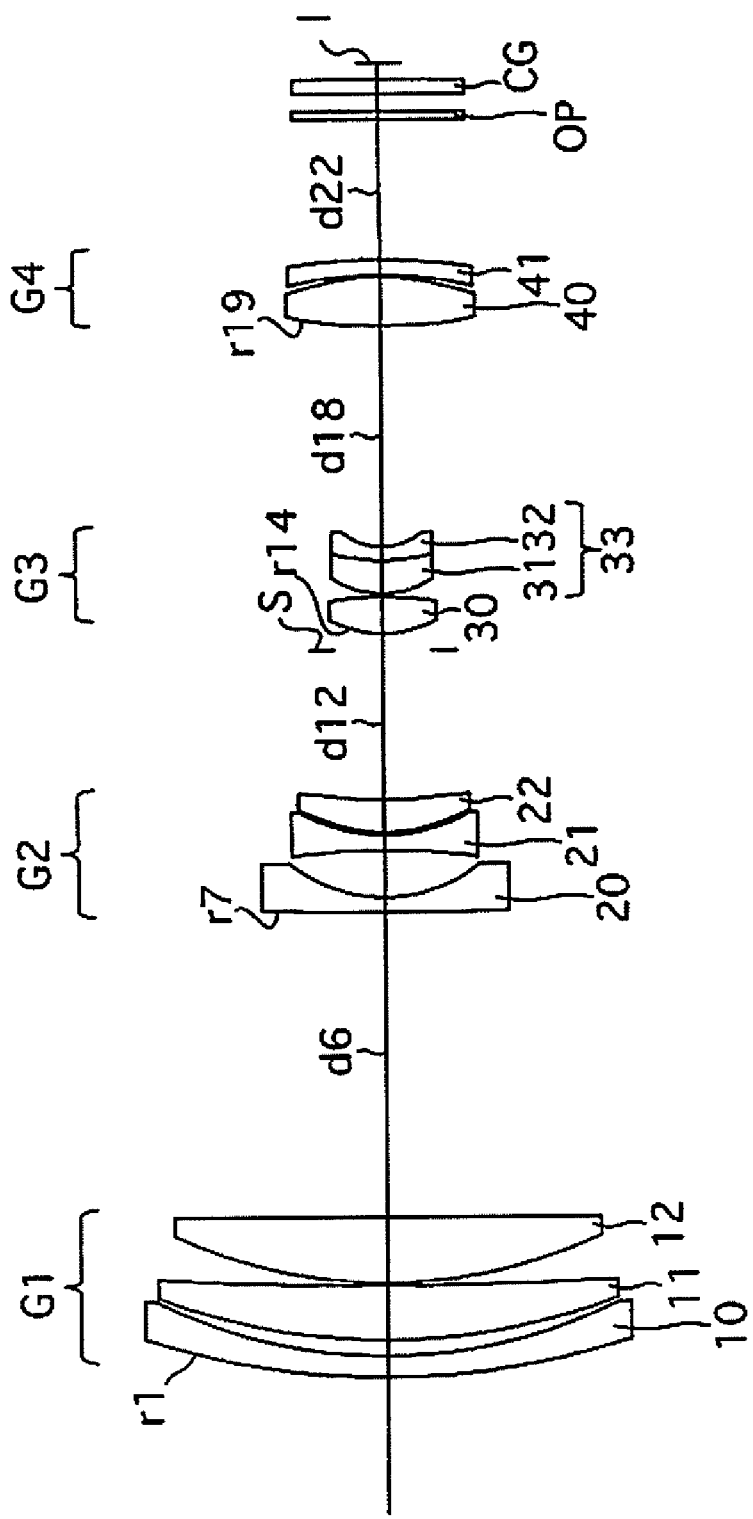
FIG. 15 shows a lens arrangement of the third numerical embodiment of the high zoom-ratio zoom lens system at an intermediate focal length when focused on an object at infinity.
Figure 16:
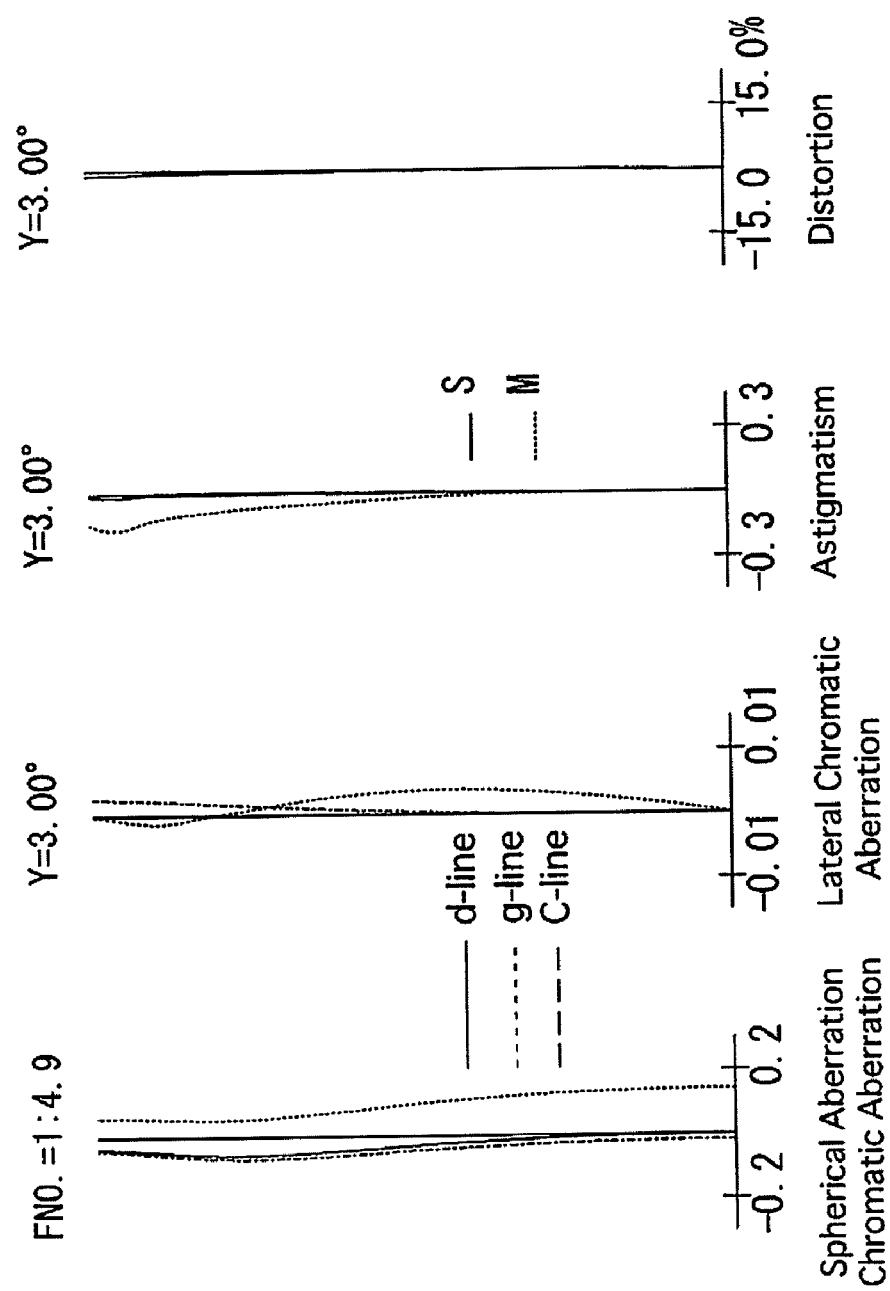
FIGS. 16A, 16B, 16C and 16D show various aberrations that occurred in the lens arrangement shown in FIG. 15.
Figure 17:
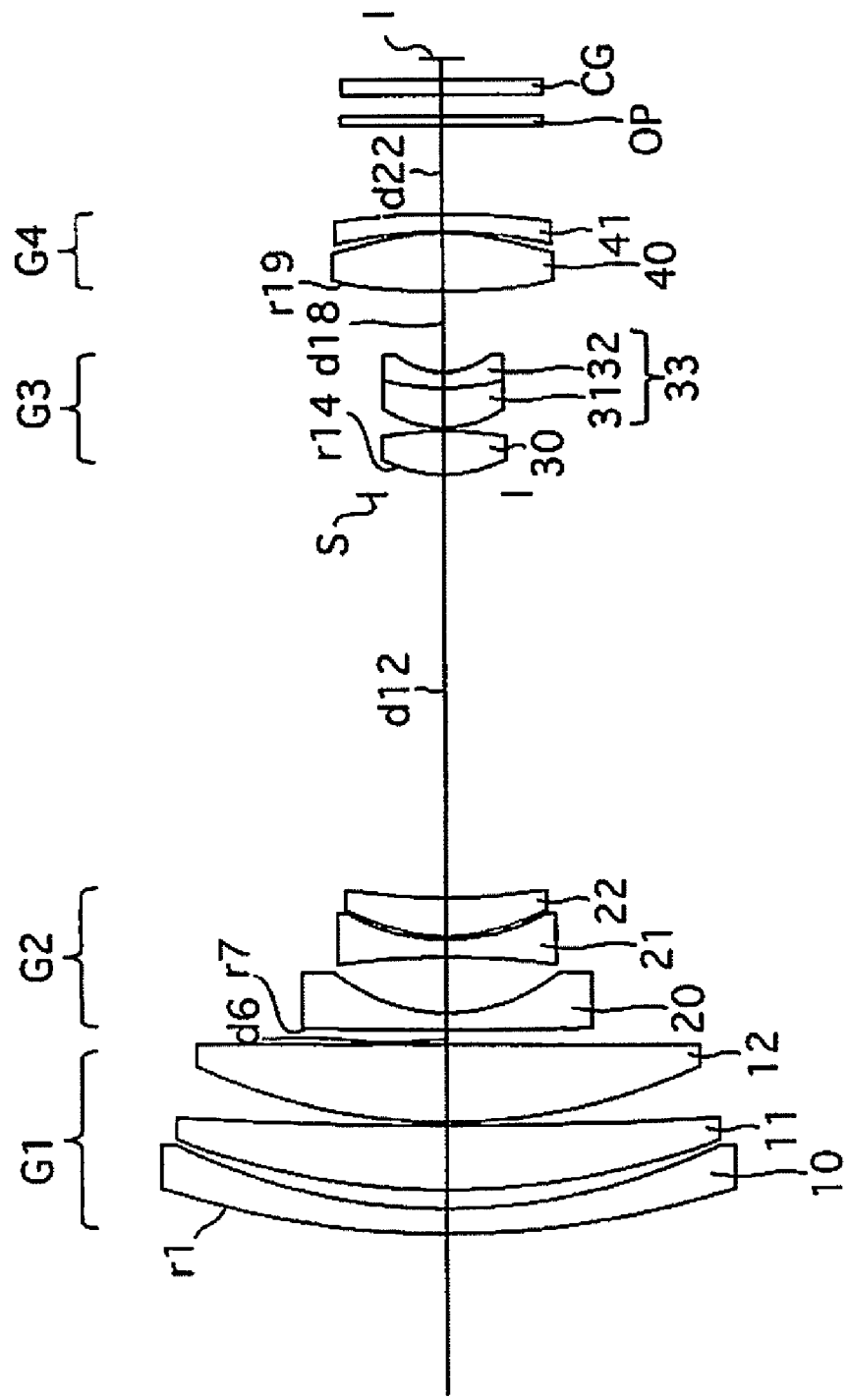
FIG. 17 shows a lens arrangement of the third numerical embodiment of the high zoom-ratio zoom lens system at the short focal length extremity when focused on an object at infinity.
Figure 18:
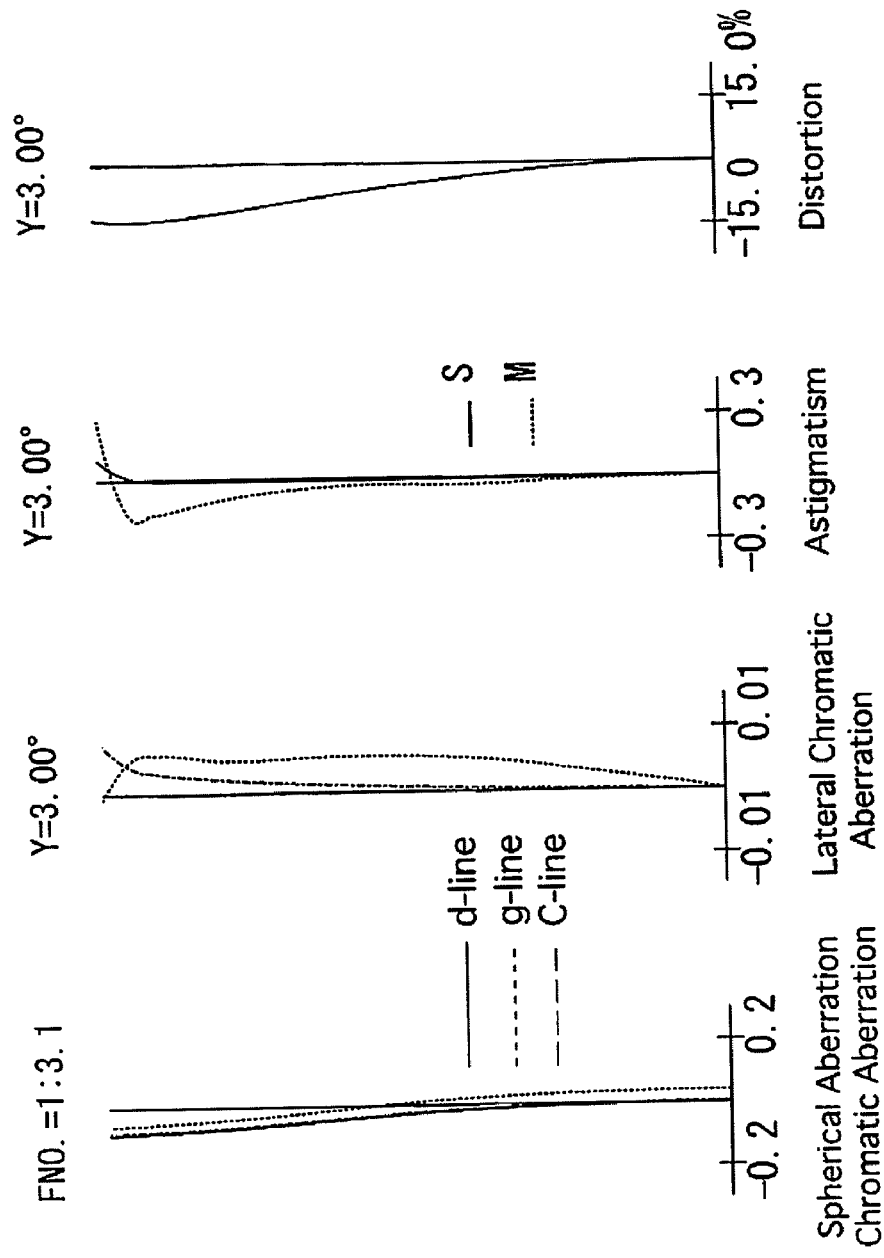
FIGS. 18A, 18B, 18C and 18D show various aberrations that occurred in the lens arrangement shown in FIG. 17.

FIGS. 13 through 18D and Tables 9 through 12 show the third numerical embodiment of the high zoom-ratio zoom lens system according to the present invention. FIG. 13 shows a lens arrangement of a third numerical embodiment of the high zoom-ratio zoom lens system, according to the present invention, at the long focal length extremity when focused on an object at infinity. FIGS. 14A, 14B, 14C and 14D show various aberrations that occurred in the lens arrangement shown in FIG. 13. FIG. 15 shows a lens arrangement of the third numerical embodiment of the high zoom-ratio zoom lens system at an intermediate focal length when focused on an object at infinity. FIGS. 16A, 16B, 16C and 16D show various aberrations that occurred in the lens arrangement shown in FIG. 15. FIG. 17 shows a lens arrangement of the third numerical embodiment of the high zoom-ratio zoom lens system at the short focal length extremity when focused on an object at infinity. FIGS. 18A, 18B, 18C and 18D show various aberrations that occurred in the lens arrangement shown in FIG. 17. Table 9 shows the lens surface data, Table 10 shows various zoom lens system data, Table 11 shows the aspherical surface data, and Table 12 shows the lens group data.

The lens arrangement of the third numerical embodiment is the same as that of the first numerical embodiment except the positive lens element 12 of the first lens group G1 being a planoconvex positive lens element having a convex surface on the object side.

TABLE 9

LENS SURFACE DATA

| Surf. No. | r | d | N (d) | νd |
|---|---|---|---|---|
| 1 | 29.510 | 0.780 | 2.00100 | 29.1 |
| 2 | 19.466 | 0.577 | | |
| 3 | 23.900 | 2.011 | 1.45860 | 90.2 |
| 4 | 150.091 | 0.100 | | |
| 5 | 18.919 | 2.438 | 1.59282 | 68.6 |
| 6 | ∞ | d6 | | |
| 7 | 115.785 | 0.550 | 1.88300 | 40.8 |
| 8 | 5.647 | 1.735 | | |
| 9 | −26.002 | 0.550 | 1.77250 | 49.6 |
| 10 | 6.345 | 0.100 | | |
| 11* | 5.481 | 1.200 | 2.00178 | 19.3 |
| 12* | 13.526 | d12 | | |
| 13 (Diaphragm) | ∞ | 0.600 | | |
| 14* | 4.030 | 1.349 | 1.49700 | 81.6 |
| 15* | −10.247 | 0.100 | | |
| 16 | 3.316 | 1.230 | 1.48749 | 70.4 |
| 17 | 7.176 | 0.500 | 1.90366 | 31.3 |
| 18 | 2.378 | d18 | | |
| 19* | 30.786 | 1.803 | 1.54358 | 55.7 |
| 20* | −6.857 | 0.050 | | |
| 21* | −10.965 | 0.550 | 1.63550 | 23.9 |
| 22 | −24.550 | d22 | | |
| 23 | ∞ | 0.300 | 1.51680 | 64.2 |
| 24 | ∞ | 0.640 | | |
| 25 | ∞ | 0.500 | 1.51680 | 64.2 |
| 26 | ∞ | — | | |

The asterisk (*) designates an aspherical surface which is rotationally symmetrical with respect to the optical axis.

TABLE 10

ZOOM LENS SYSTEM DATA
Zoom Ratio 17.50

| | Short Focal Length Extremity | Intermediate Focal Length | Long Focal Length Extremity |
|---|---|---|---|
| FNO. | 3.1 | 4.9 | 5.5 |
| F | 3.60 | 14.10 | 63.00 |
| W | 43.8 | 12.1 | 2.8 |
| Y | 3.00 | 3.00 | 3.00 |
| fB | 0.51 | 0.51 | 0.51 |
| L | 36.42 | 48.07 | 55.00 |
| d6 | 0.420 | 11.159 | 22.091 |
| d12 | 12.591 | 5.495 | 1.100 |
| d18 | 2.500 | 8.114 | 11.840 |
| d22 | 2.737 | 5.126 | 1.800 |

TABLE 11

ASPHERICAL SURFACE DATA
(aspherical surface coefficients not indicated are zero (0.00)):

| Surf. No. | K | A4 | A6 | A8 | A10 |
|---|---|---|---|---|---|
| 11 | 0.000 | $-0.1381 \times 10^{-2}$ | $-0.1935 \times 10^{-4}$ | $-0.2224 \times 10^{-5}$ | |
| 12 | 0.000 | $-0.1075 \times 10^{-2}$ | $-0.1999 \times 10^{-5}$ | $-0.2218 \times 10^{-5}$ | |
| 14 | −1.000 | $-0.1774 \times 10^{-3}$ | $0.1765 \times 10^{-3}$ | $-0.2021 \times 10^{-4}$ | |
| 15 | 0.000 | $0.5132 \times 10^{-3}$ | $0.1991 \times 10^{-3}$ | $-0.2629 \times 10^{-4}$ | |
| 19 | 0.000 | $0.3729 \times 10^{-3}$ | $0.7916 \times 10^{-4}$ | $-0.1644 \times 10^{-5}$ | |
| 20 | 0.000 | $0.3812 \times 10^{-2}$ | $-0.2279 \times 10^{-3}$ | $0.9876 \times 10^{-5}$ | $-0.1867 \times 10^{-6}$ |
| 21 | 0.000 | $0.3073 \times 10^{-2}$ | $-0.2291 \times 10^{-3}$ | $0.5125 \times 10^{-5}$ | |

| LENS GROUP DATA | | |
| --- | --- | --- |
| Lens Group | 1st Surf. | Focal Length |
| 1 | 1 | 32.91 |
| 2 | 7 | −4.92 |
| 3 | 14 | 7.98 |
| 4 | 19 | 15.70 |

Embodiment 4

Figure 19:
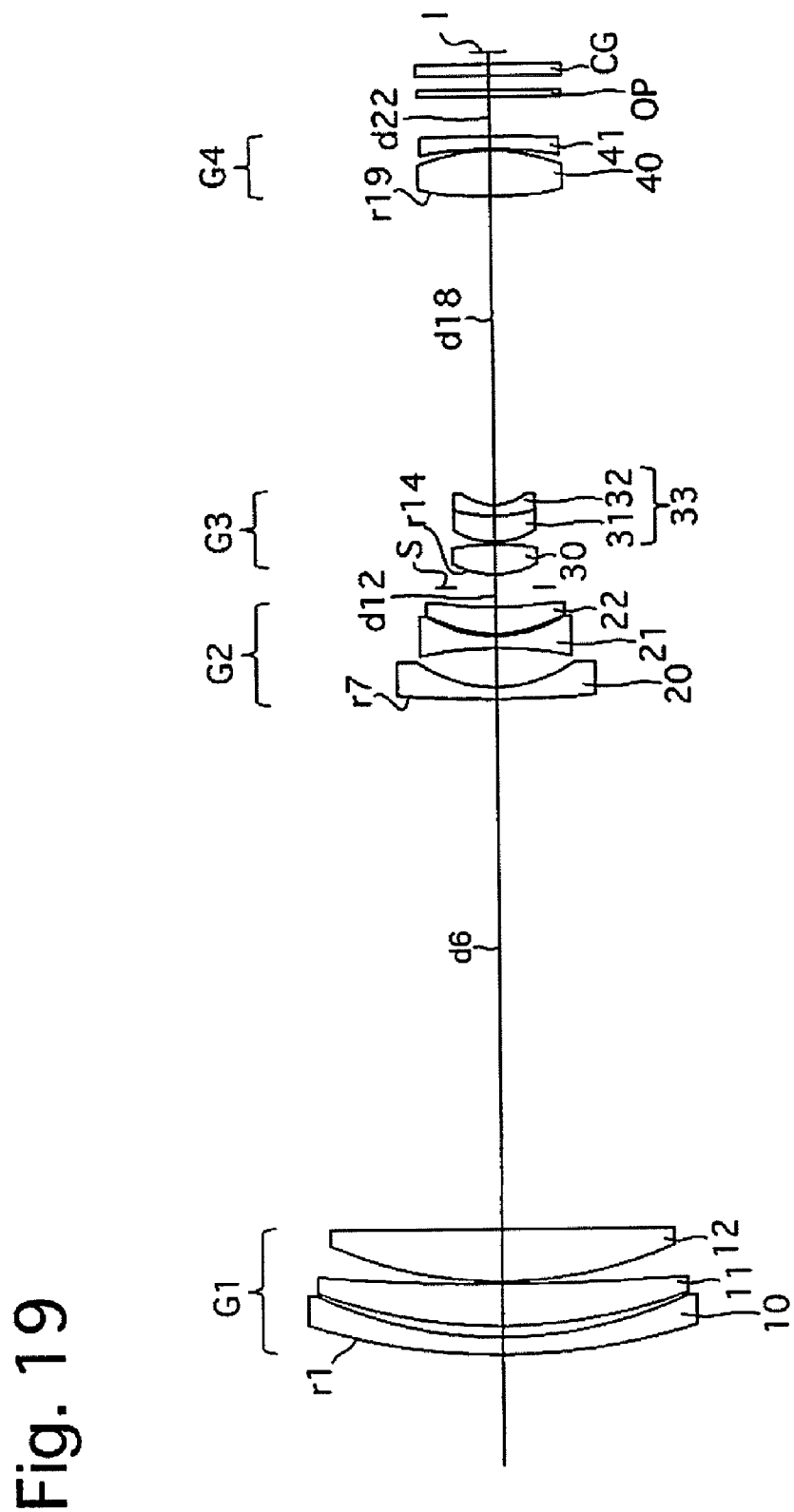
FIG. 19 shows a lens arrangement of a fourth numerical embodiment of the high zoom-ratio zoom lens system, according to the present invention, at the long focal length extremity when focused on an object at infinity.
Figure 20:
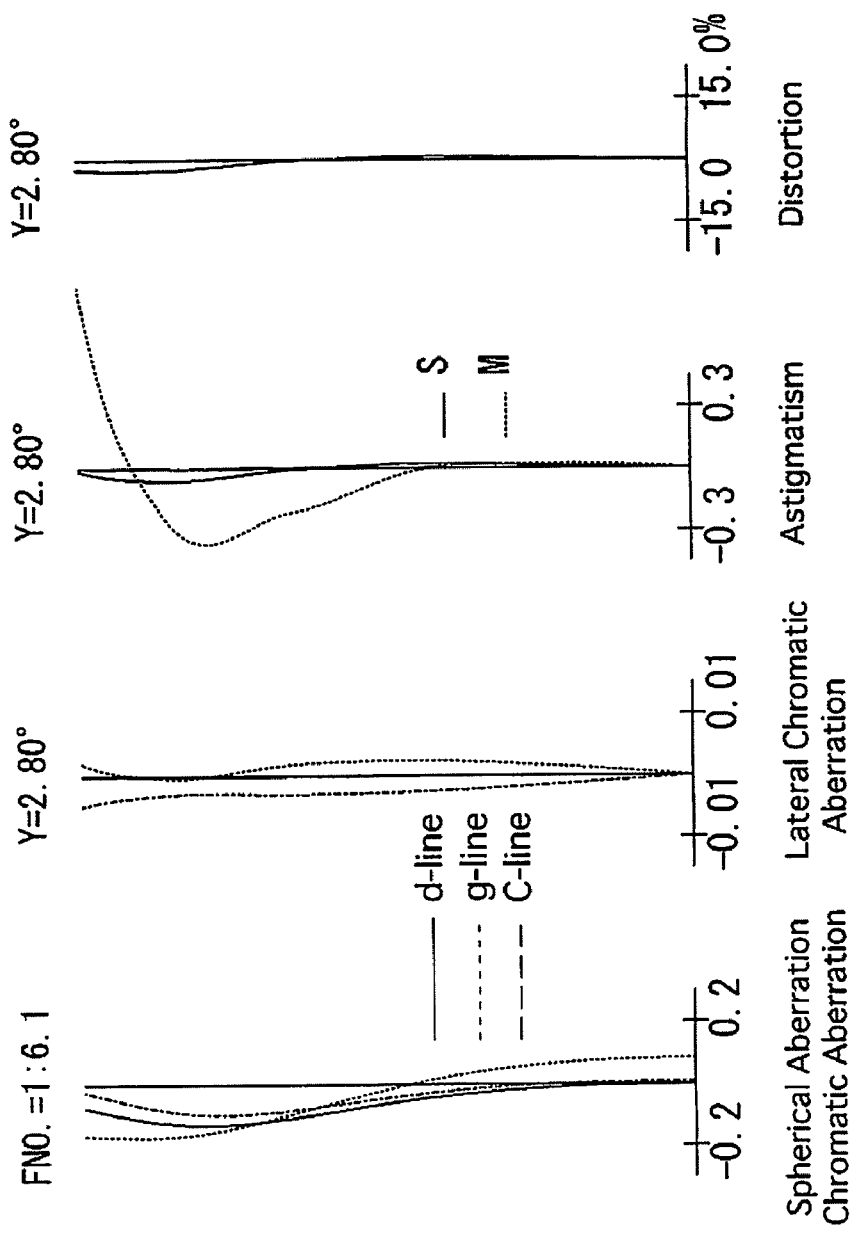
FIGS. 20A, 20B, 20C and 20D show various aberrations that occurred in the lens arrangement shown in FIG. 19.
Figure 21:
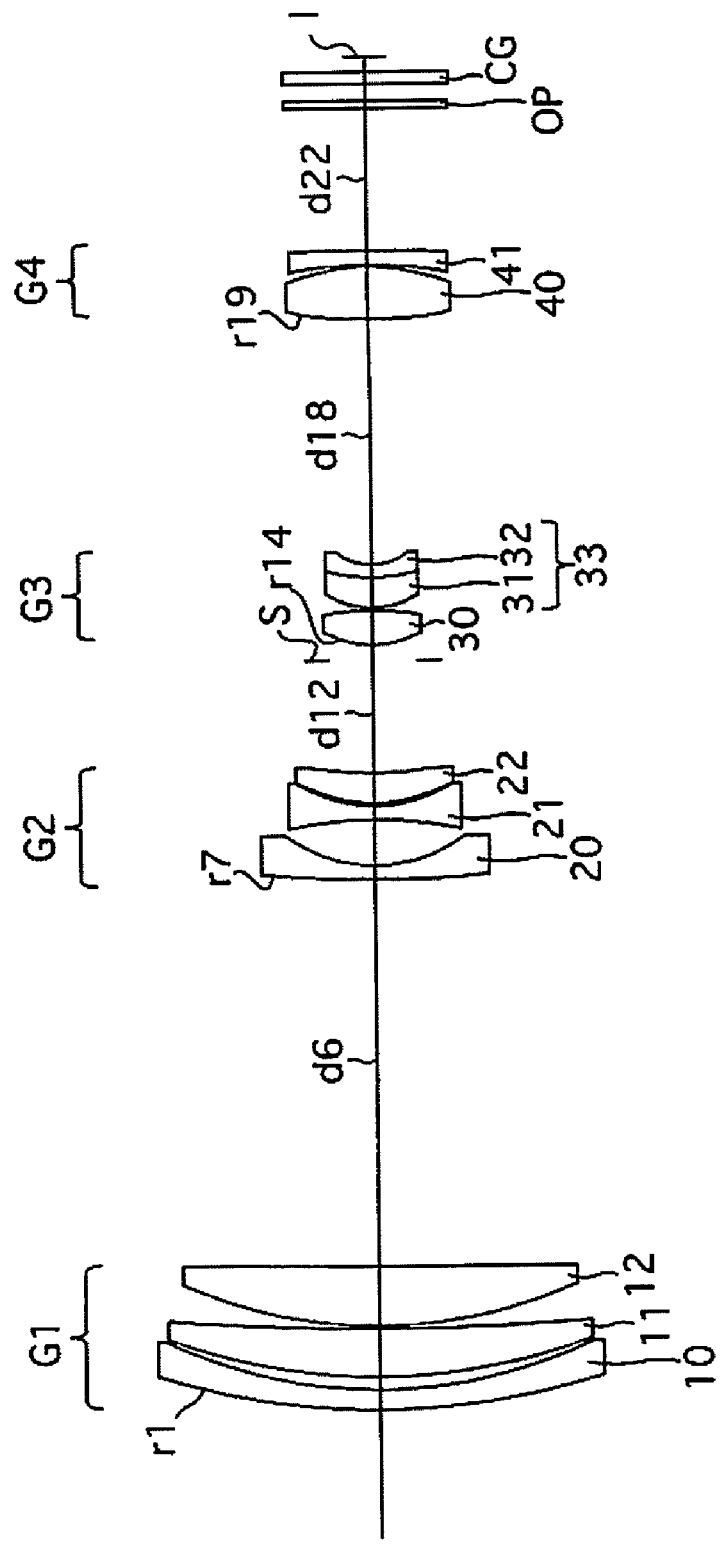
FIG. 21 shows a lens arrangement of the fourth numerical embodiment of the high zoom-ratio zoom lens system at an intermediate focal length when focused on an object at infinity.
Figure 22:
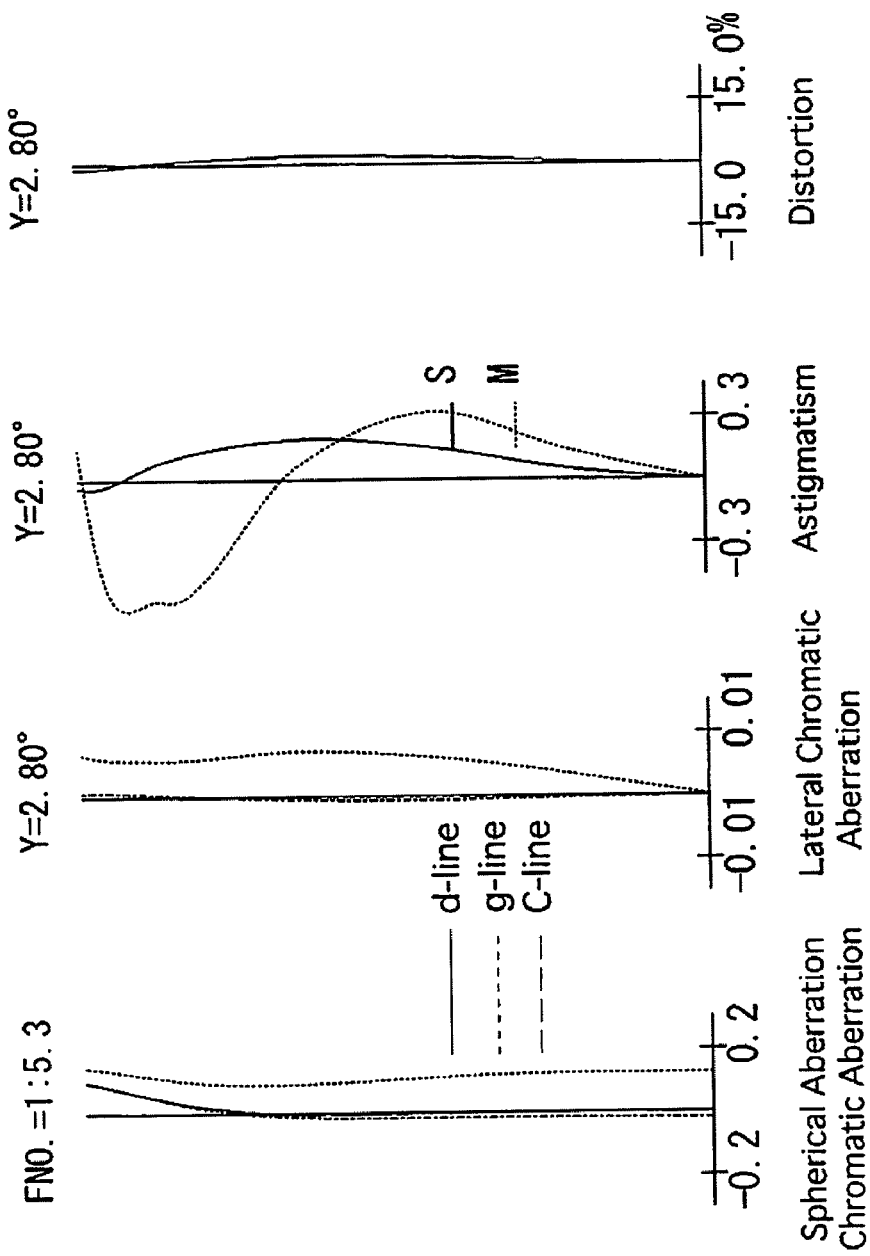
FIGS. 22A, 22B, 22C and 22D show various aberrations that occurred in the lens arrangement shown in FIG. 21.
Figure 23:
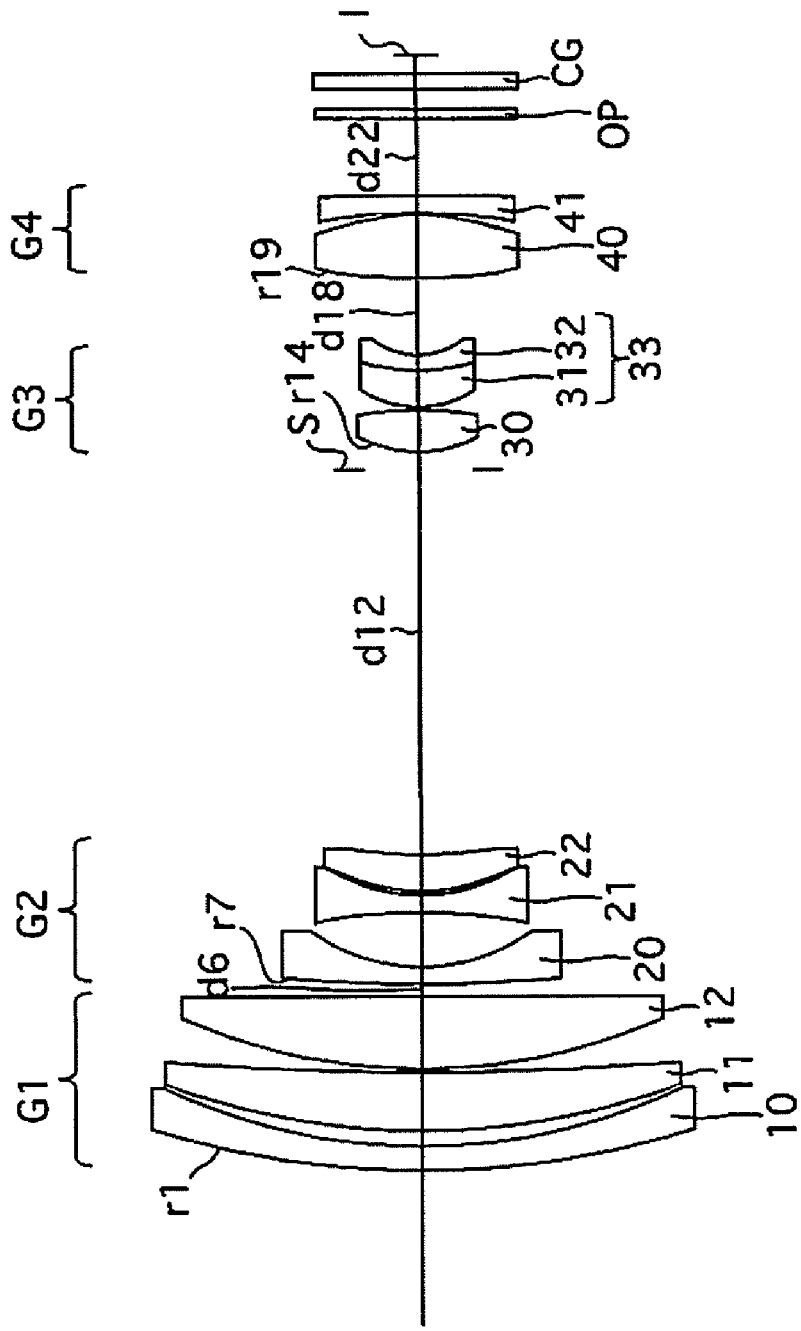
FIG. 23 shows a lens arrangement of the fourth numerical embodiment of the high zoom-ratio zoom lens system at the short focal length extremity when focused on an object at infinity.
Figure 24:
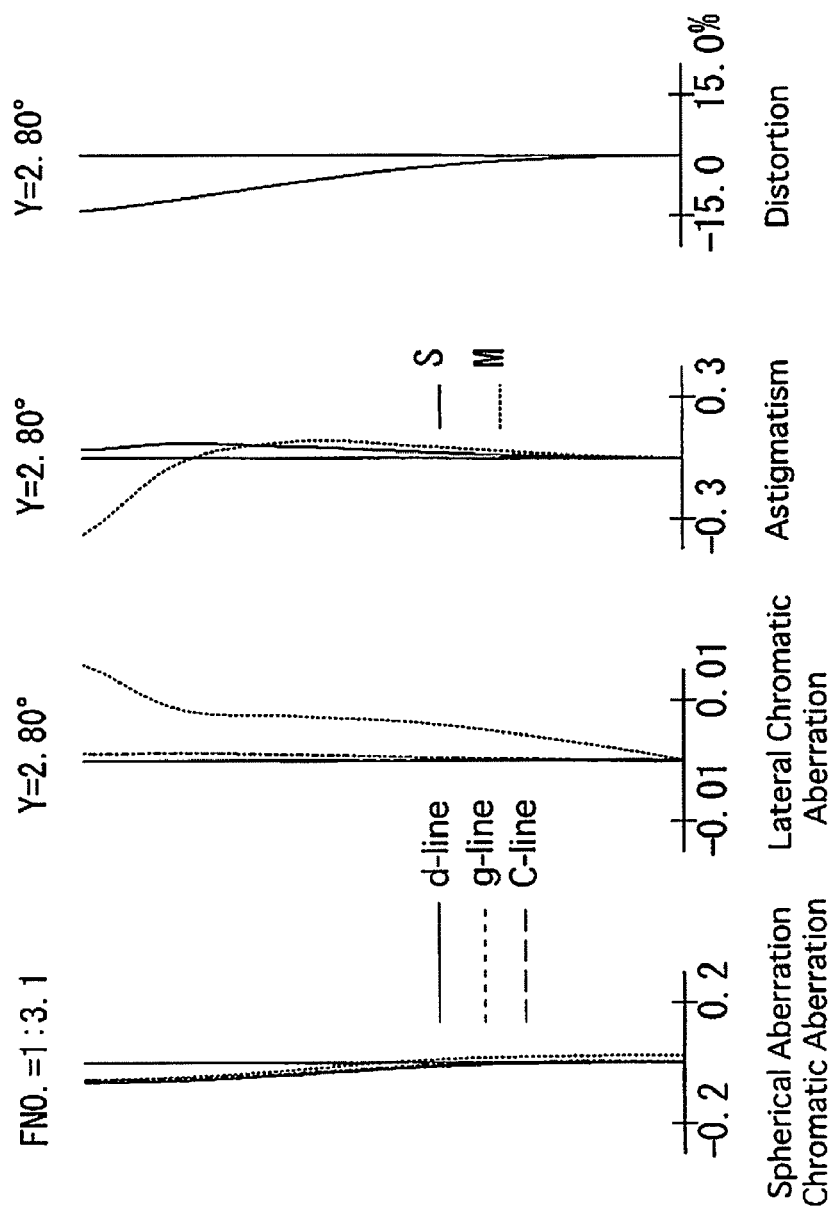
FIGS. 24A, 24B, 24C and 24D show various aberrations that occurred in the lens arrangement shown in FIG. 23.

FIGS. 19 through 24D and Tables 13 through 16 show the fourth numerical embodiment of the high zoom-ratio zoom lens system according to the present invention. FIG. 19 shows a lens arrangement of a fourth numerical embodiment of the high zoom-ratio zoom lens system, according to the present invention, at the long focal length extremity when focused on an object at infinity. FIGS. 20A, 20B, 20C and 20D show various aberrations that occurred in the lens arrangement shown in FIG. 19. FIG. 21 shows a lens arrangement of the fourth numerical embodiment of the high zoom-ratio zoom lens system at an intermediate focal length when focused on an object at infinity. FIGS. 22A, 22B, 22C and 22D show various aberrations that occurred in the lens arrangement shown in FIG. 21. FIG. 23 shows a lens arrangement of the fourth numerical embodiment of the high zoom-ratio zoom lens system at the short focal length extremity when focused on an object at infinity. FIGS. 24A, 24B, 24C and 24D show various aberrations that occurred in the lens arrangement shown in FIG. 23. Table 13 shows the lens surface data, Table 14 shows various zoom lens system data, Table 15 shows the aspherical surface data, and Table 16 shows the lens group data.

The lens arrangement of the fourth numerical embodiment is the same as that of the third numerical embodiment except for the negative meniscus lens element 41 of the fourth lens group G4 having an aspherical surface on each side thereof (rather than only on the surface on the object side).

TABLE 13

| LENS SURFACE DATA | | | | |
| --- | --- | --- | --- | --- |
| Surf. No. | r | d | N (d) | vd |
| 1 | 30.187 | 0.780 | 2.00100 | 29.1 |
| 2 | 19.923 | 0.509 | | |
| 3 | 24.518 | 1.902 | 1.45860 | 90.2 |
| 4 | 114.018 | 0.100 | | |
| 5 | 19.652 | 2.349 | 1.59282 | 68.6 |
| 6 | ∞ | d6 | | |
| 7 | 51.806 | 0.550 | 1.88300 | 40.8 |
| 8 | 6.191 | 1.782 | | |
| 9 | −17.128 | 0.550 | 1.77250 | 49.6 |
| 10 | 5.991 | 0.100 | | |
| 11* | 5.343 | 1.200 | 2.00178 | 19.3 |
| 12* | 13.270 | d12 | | |
| 13 (Diaphragm) | ∞ | 0.600 | | |
| 14* | 3.906 | 1.360 | 1.49700 | 81.6 |
| 15* | −10.199 | 0.100 | | |
| 16 | 3.388 | 1.187 | 1.48749 | 70.4 |
| 17 | 6.445 | 0.500 | 1.90366 | 31.3 |
| 18 | 2.362 | d18 | | |
| 19* | 33.979 | 2.061 | 1.54358 | 55.7 |
| 20* | −6.373 | 0.050 | | |
| 21* | −14.471 | 0.550 | 1.63550 | 23.9 |
| 22* | −119.140 | d22 | | |
| 23 | ∞ | 0.300 | 1.51680 | 64.2 |
| 24 | ∞ | 0.640 | | |
| 25 | ∞ | 0.500 | 1.51680 | 64.2 |
| 26 | ∞ | — | | |

The asterisk (*) designates an aspherical surface which is rotationally symmetrical with respect to the optical axis.

TABLE 14

| ZOOM LENS SYSTEM DATA | | | |
| --- | --- | --- | --- |
| Zoom Ratio 20.00 | | | |
| | Short Focal Length Extremity | Intermediate Focal Length | Long Focal Length Extremity |
| FNO. | 3.1 | 5.3 | 6.1 |
| F | 3.60 | 20.00 | 72.00 |
| W | 42.1 | 8.1 | 2.3 |
| Y | 2.80 | 2.80 | 2.80 |
| fB | 0.51 | 0.51 | 0.51 |
| L | 36.04 | 53.03 | 58.87 |
| d6 | 0.420 | 15.176 | 24.018 |
| d12 | 12.454 | 4.451 | 0.895 |
| d18 | 2.500 | 9.670 | 13.979 |
| d22 | 2.483 | 5.550 | 1.800 |

TABLE 15

ASPHERICAL SURFACE DATA
(aspherical surface coefficients not indicated are zero (0.00)):

| Surf. No. | K | A4 | A6 | A8 | A10 |
| --- | --- | --- | --- | --- | --- |
| 11 | 0.000 | $-0.1517 \times 10^{-2}$ | $-0.3547 \times 10^{-4}$ | $-0.5185 \times 10^{-5}$ | |
| 12 | 0.000 | $-0.1097 \times 10^{-2}$ | $-0.3620 \times 10^{-4}$ | $-0.3924 \times 10^{-5}$ | |
| 14 | −1.000 | $-0.1976 \times 10^{-3}$ | $0.1778 \times 10^{-3}$ | $-0.1979 \times 10^{-4}$ | |
| 15 | 0.000 | $0.5374 \times 10^{-3}$ | $0.2021 \times 10^{-3}$ | $-0.2600 \times 10^{-4}$ | |
| 19 | 0.000 | $0.5959 \times 10^{-3}$ | $0.1237 \times 10^{-3}$ | $-0.4908 \times 10^{-5}$ | |
| 20 | 0.000 | $0.3829 \times 10^{-2}$ | $-0.2139 \times 10^{-3}$ | $0.8703 \times 10^{-5}$ | $-0.2327 \times 10^{-6}$ |
| 21 | 0.000 | $0.2736 \times 10^{-2}$ | $-0.2646 \times 10^{-3}$ | $0.5801 \times 10^{-5}$ | |
| 22 | 0.000 | $0.1607 \times 10^{-2}$ | $-0.3303 \times 10^{-3}$ | $0.1924 \times 10^{-4}$ | |

TABLE 16

LENS GROUP DATA

| Lens Group | 1st Surf. | Focal Length |
|---|---|---|
| 1 | 1 | 35.53 |
| 2 | 7 | −4.95 |
| 3 | 14 | 7.81 |
| 4 | 19 | 16.18 |

Embodiment 5

Figure 25:
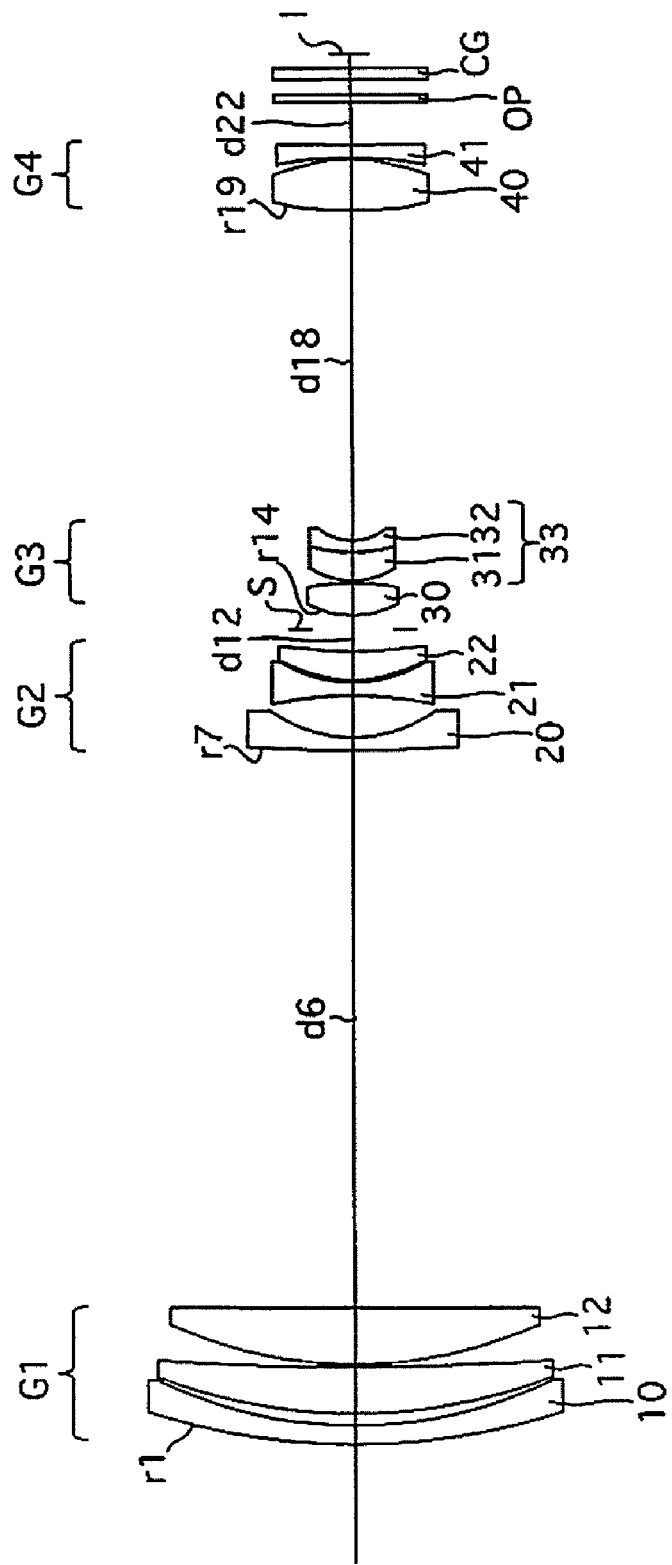
FIG. 25 shows a lens arrangement of a fifth numerical embodiment of the high zoom-ratio zoom lens system, according to the present invention, at the long focal length extremity when focused on an object at infinity.
Figure 26:
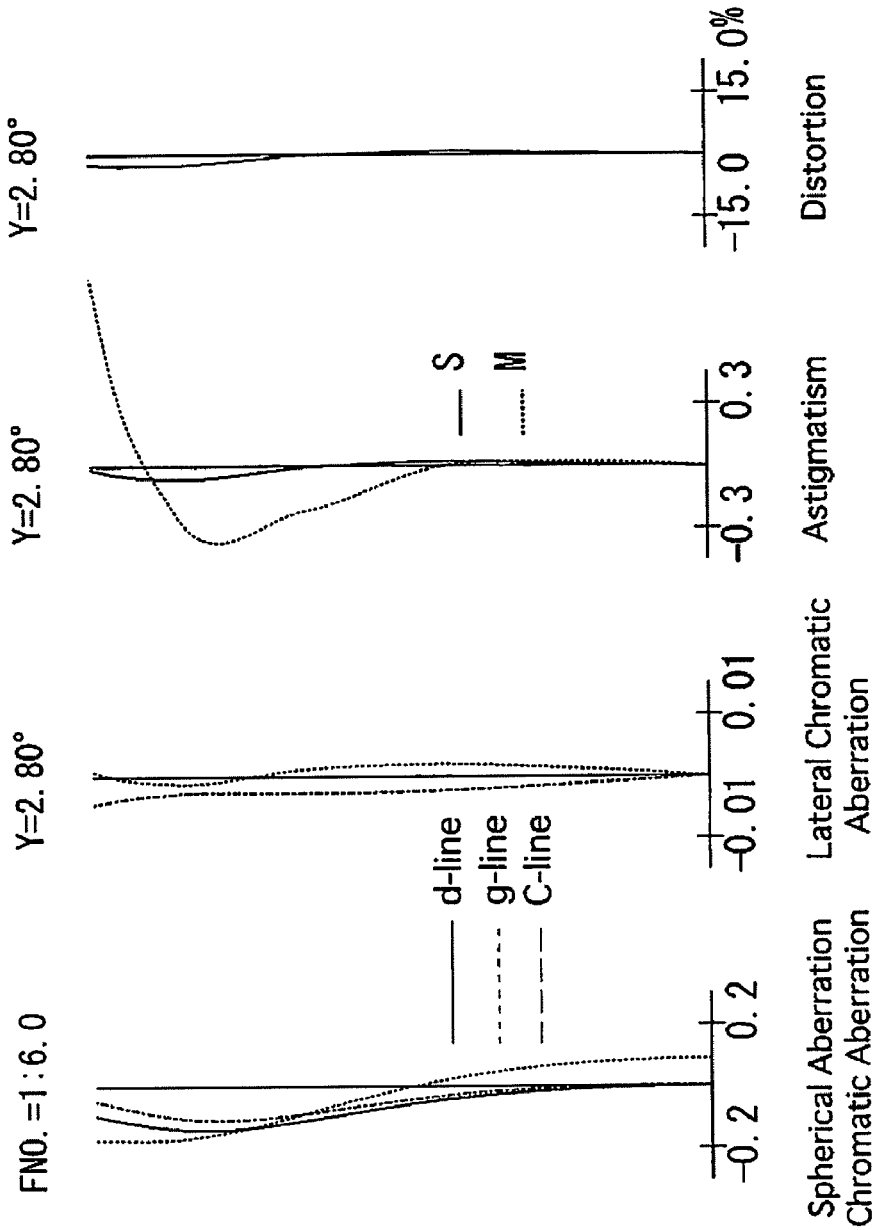
FIGS. 26A, 26B, 26C and 26D show various aberrations that occurred in the lens arrangement shown in FIG. 25.
Figure 27:
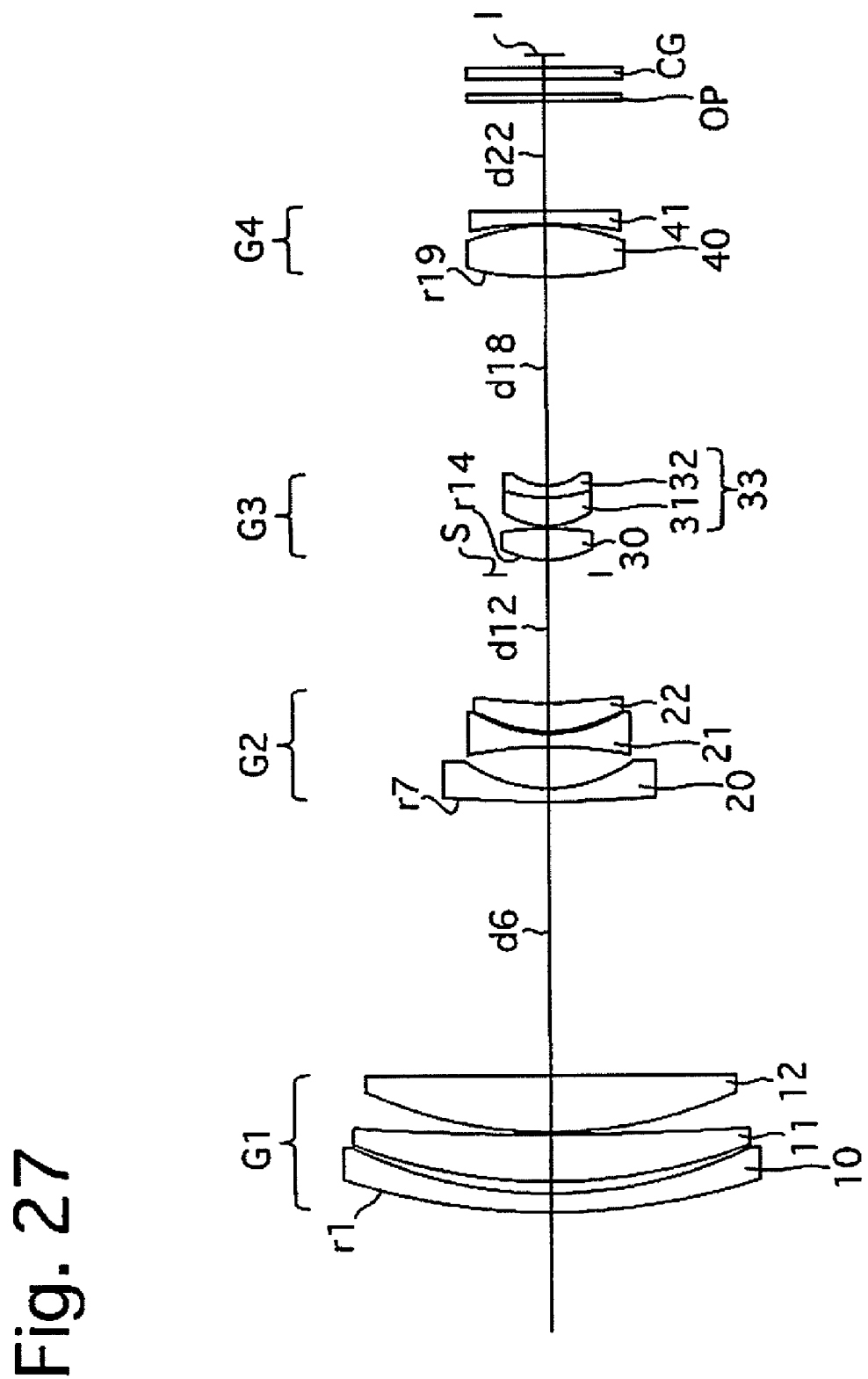
FIG. 27 shows a lens arrangement of the fifth numerical embodiment of the high zoom-ratio zoom lens system at an intermediate focal length when focused on an object at infinity.
Figure 28:
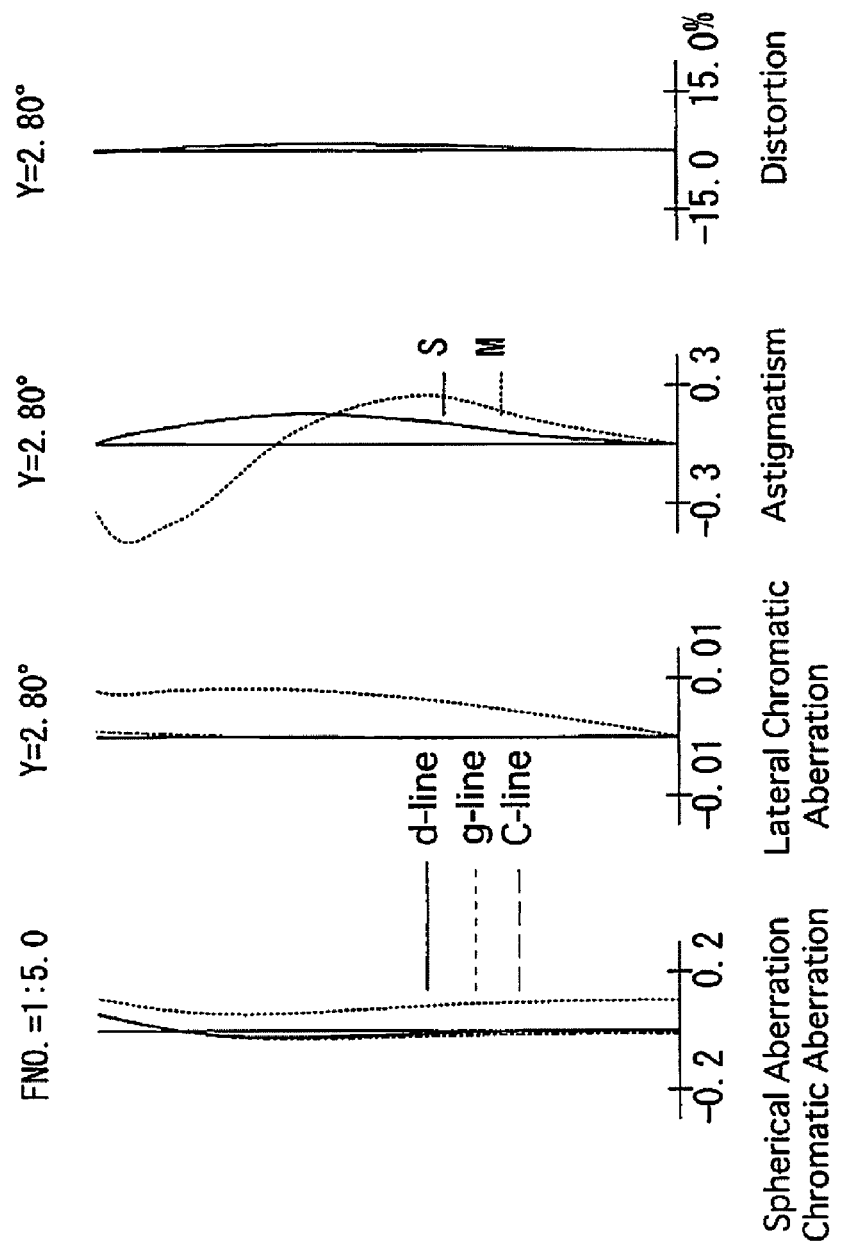
FIGS. 28A, 28B, 28C and 28D show various aberrations that occurred in the lens arrangement shown in FIG. 27.
Figure 29:
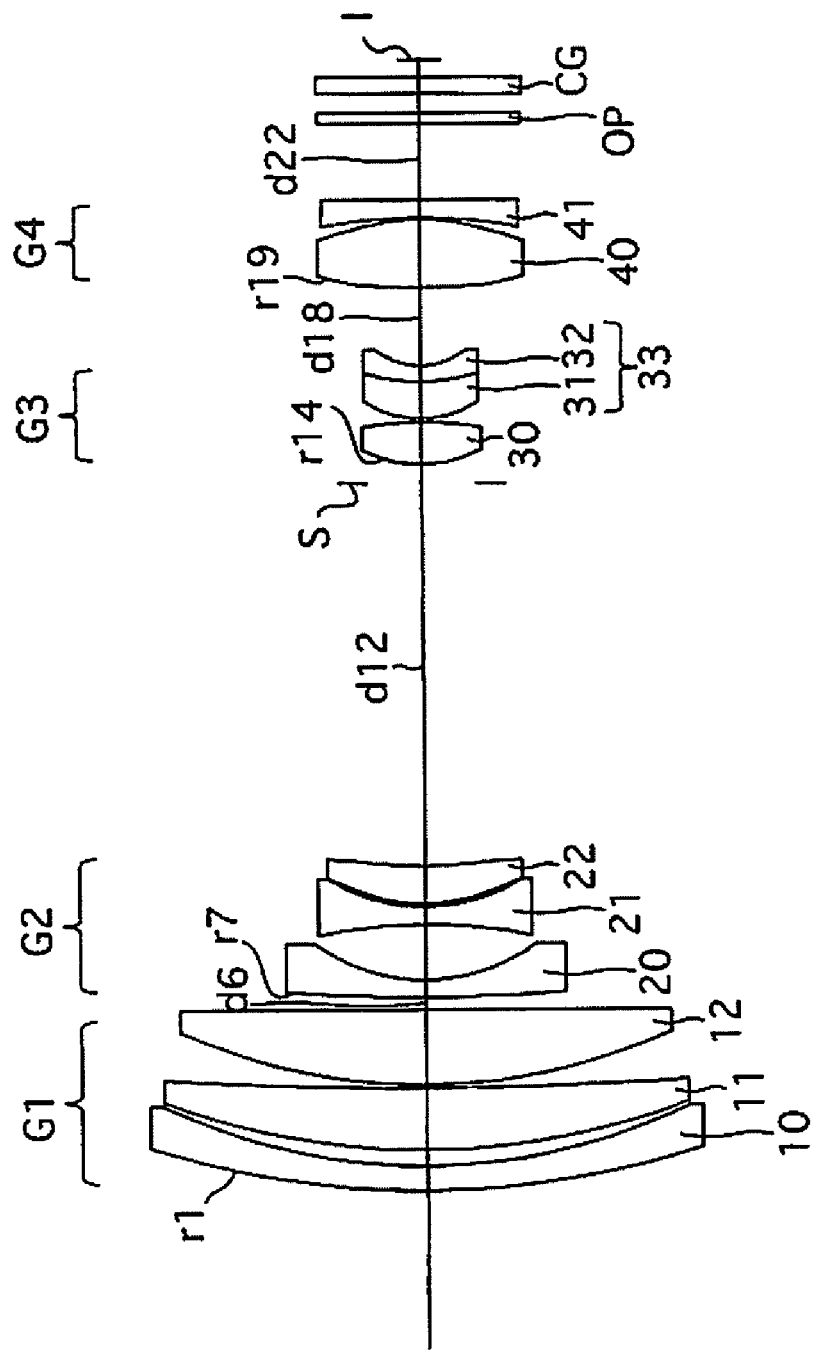
FIG. 29 shows a lens arrangement of the fifth numerical embodiment of the high zoom-ratio zoom lens system at the short focal length extremity when focused on an object at infinity.
Figure 30:
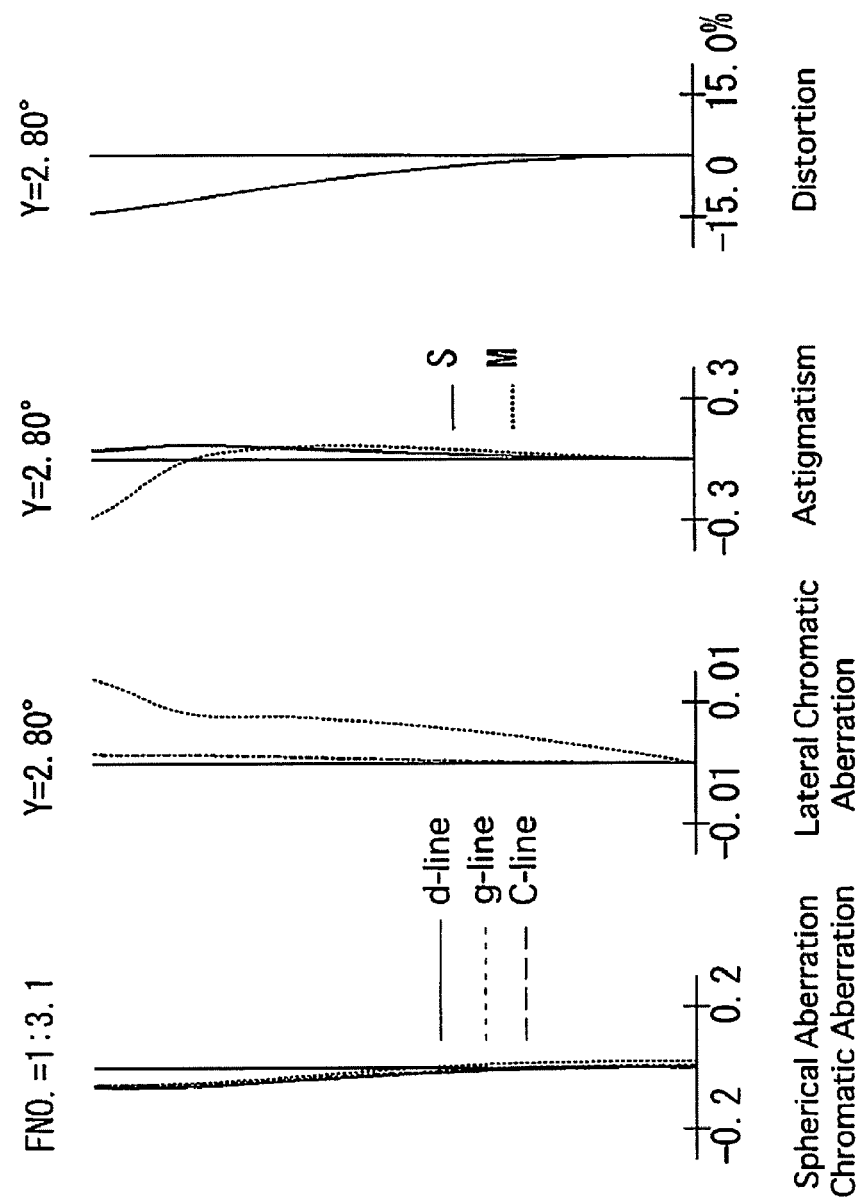
FIGS. 30A, 30B, 30C and 30D show various aberrations that occurred in the lens arrangement shown in FIG. 29.

FIGS. 25 through 30D and Tables 17 through 20 show the fifth numerical embodiment of the high zoom-ratio zoom lens system according to the present invention. FIG. 25 shows a lens arrangement of a fifth numerical embodiment of the high zoom-ratio zoom lens system, according to the present invention, at the long focal length extremity when focused on an object at infinity. FIGS. 26A, 26B, 26C and 26D show various aberrations that occurred in the lens arrangement shown in FIG. 25. FIG. 27 shows a lens arrangement of the fifth numerical embodiment of the high zoom-ratio zoom lens system at an intermediate focal length when focused on an object at infinity. FIGS. 28A, 28B, 28C and 28D show various aberrations that occurred in the lens arrangement shown in FIG. 27. FIG. 29 shows a lens arrangement of the fifth numerical embodiment of the high zoom-ratio zoom lens system at the short focal length extremity when focused on an object at infinity. FIGS. 30A, 30B, 30C and 30D show various aberrations that occurred in the lens arrangement shown in FIG. 29. Table 17 shows the lens surface data, Table 18 shows various zoom lens system data, Table 19 shows the aspherical surface data, and Table 20 shows the lens group data.

The lens arrangement of the fifth numerical embodiment is the same as that of the fourth numerical embodiment.

TABLE 17

LENS SURFACE DATA

| Surf. No. | r | d | N (d) | νd |
|---|---|---|---|---|
| 1 | 29.768 | 0.780 | 2.00100 | 29.1 |
| 2 | 19.749 | 0.513 | | |
| 3 | 24.301 | 1.964 | 1.43500 | 95.0 |
| 4 | 135.630 | 0.100 | | |
| 5 | 19.393 | 2.388 | 1.59282 | 68.6 |
| 6 | ∞ | d6 | | |
| 7 | 63.645 | 0.550 | 1.88300 | 40.8 |
| 8 | 6.200 | 1.770 | | |
| 9 | −17.170 | 0.550 | 1.77250 | 49.6 |
| 10 | 6.016 | 0.100 | | |
| 11* | 5.372 | 1.200 | 2.00178 | 19.3 |

TABLE 17-continued

LENS SURFACE DATA

| Surf. No. | r | d | N (d) | νd |
|---|---|---|---|---|
| 12* | 13.471 | d12 | | |
| 13 (Diaphragm) | ∞ | 0.600 | | |
| 14* | 4.015 | 1.344 | 1.49700 | 81.6 |
| 15* | −10.324 | 0.100 | | |
| 16 | 3.309 | 1.198 | 1.48749 | 70.4 |
| 17 | 6.278 | 0.500 | 1.90366 | 31.3 |
| 18 | 2.358 | d18 | | |
| 19* | 25.857 | 2.158 | 1.54358 | 55.7 |
| 20* | −6.398 | 0.050 | | |
| 21* | −14.659 | 0.550 | 1.63550 | 23.9 |
| 22* | −409.772 | d22 | | |
| 23 | ∞ | 0.300 | | 1.51680 | 64.2 |
| 24 | ∞ | 0.640 | | |
| 25 | ∞ | 0.500 | 1.51680 | 64.2 |
| 26 | ∞ | — | | |

The asterisk (*) designates an aspherical surface which is rotationally symmetrical with respect to the optical axis.

TABLE 18

ZOOM LENS SYSTEM DATA
Zoom Ratio 19.50

| | Short Focal Length Extremity | Intermediate Focal Length | Long Focal Length Extremity |
|---|---|---|---|
| FNO. | 3.1 | 5.0 | 6.0 |
| F | 3.60 | 14.10 | 70.20 |
| W | 42.2 | 11.3 | 2.3 |
| Y | 2.80 | 2.80 | 2.80 |
| fB | 0.51 | 0.51 | 0.51 |
| L | 35.94 | 48.80 | 58.60 |
| d6 | 0.420 | 11.589 | 23.597 |
| d12 | 12.201 | 5.435 | 0.946 |
| d18 | 2.500 | 8.824 | 13.899 |
| d22 | 2.452 | 4.594 | 1.800 |

TABLE 19

ASPHERICAL SURFACE DATA (aspherical surface coefficients not indicated are zero (0.00)):

| Surf. No. | K | A4 | A6 | A8 | A10 |
|---|---|---|---|---|---|
| 11 | 0.000 | $-0.1458 \times 10^{-2}$ | $-0.2669 \times 10^{-4}$ | $-0.4796 \times 10^{-5}$ | |
| 12 | 0.000 | $-0.1038 \times 10^{-2}$ | $-0.2952 \times 10^{-4}$ | $-0.3488 \times 10^{-5}$ | |
| 14 | −1.000 | $-0.1769 \times 10^{-3}$ | $0.1788 \times 10^{-3}$ | $-0.2031 \times 10^{-4}$ | |
| 15 | 0.000 | $0.5390 \times 10^{-3}$ | $0.1995 \times 10^{-3}$ | $-0.2571 \times 10^{-4}$ | |
| 19 | 0.000 | $0.5303 \times 10^{-3}$ | $0.1182 \times 10^{-3}$ | $-0.4444 \times 10^{-5}$ | |
| 20 | 0.000 | $0.3796 \times 10^{-2}$ | $-0.2177 \times 10^{-3}$ | $0.8724 \times 10^{-5}$ | $-0.2191 \times 10^{-6}$ |
| 21 | 0.000 | $0.2715 \times 10^{-2}$ | $-0.2634 \times 10^{-3}$ | $0.5511 \times 10^{-5}$ | |
| 22 | 0.000 | $0.1607 \times 10^{-2}$ | $-0.3303 \times 10^{-3}$ | $0.1924 \times 10^{-4}$ | |

TABLE 20

LENS GROUP DATA

| Lens Group | 1st Surf. | Focal Length |
|---|---|---|
| 1 | 1 | 34.96 |
| 2 | 7 | −4.89 |
| 3 | 14 | 7.82 |
| 4 | 19 | 15.85 |

The numerical values of each condition for each numerical embodiment are shown in Table 21.

TABLE 21

|  | Embod. 1 | Embod. 2 | Embod. 3 | Embod. 4 | Embod. 5 |
|---|---|---|---|---|---|
| Cond. (1) | 1.691 | 1.487 | 1.915 | 2.026 | 2.008 |
| Cond. (2) | 6.189 | 5.327 | 7.482 | 7.193 | 7.187 |
| Cond. (3) | 10.614 | 7.908 | 10.486 | 12.265 | 11.694 |
| Cond. (4) | 1.904 | 2.001 | 2.001 | 2.001 | 2.001 |
| Cond. (5) | 31.3 | 29.1 | 29.1 | 29.1 | 29.1 |
| Cond. (6) | 137.2 | 158.8 | 158.8 | 158.8 | 163.6 |
| Cond. (7) | 153.3 | 152 | 152 | 152 | 152 |
| Cond. (8) | 19.3 | 19.3 | 19.3 | 19.3 | 19.3 |
| Cond. (9) | 28.5 | 31.8 | 31.8 | 31.8 | 31.8 |

As can be understood from Table 21, the first through fifth numerical embodiments satisfy conditions (1) through (9). Furthermore, as can be understood from the aberration diagrams, the various aberrations are suitably corrected.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A high zoom-ratio zoom lens system comprising a positive first lens group, a negative second lens group, a positive third lens group, and a positive fourth lens group, in that order from the object side, wherein upon zooming from the short focal length extremity to the long focal length extremity, each of the first through fourth lens groups are moved along the optical axis direction, wherein an amount of movement of said first lens group along the optical axis direction is greater than that of said third lens group, and wherein the following conditions (1) and (2) are satisfied:

$$1.4 < FT/F1 < 2.4 \qquad (1), \text{ and}$$

$$5 < M2T/M2W < 10 \qquad (2),$$

wherein

FT designates the entire focal length at the long focal length extremity,

F1 designates the focal length of the first lens group,

M2T designates the magnification of the second lens group with respect to an object at infinity at the long focal length extremity, and M2W designates the magnification of the second lens group with respect to an object at infinity at the short focal length extremity.

2. The high zoom-ratio zoom lens system according to claim 1, wherein a lens element that is provided closest to the object side within the third lens group comprises a positive lens element having an aspherical surface on at least one side thereof and satisfies the following condition (3):

$$5 < FT/fa < 15 \qquad (3),$$

wherein

FT designates the focal length of the entire said zoom lens system at the long focal length extremity, and fa designates the focal length of said positive lens element that is provided closest to the object side within said third lens group.

3. The high zoom-ratio zoom lens system according to claim 1, wherein the following conditions (4) and (5) are satisfied:

$$1.9 < n1 \qquad (4), \text{ and}$$

$$25 < v1 < 35 \qquad (5),$$

wherein n1 designates the refractive index at the d-line of the lens element that is provided closest to the object side within the first lens group, and v1 designates the Abbe number with respect to the d-line of the lens element that is provided closest to the object side within the first lens group.

4. The high zoom-ratio zoom lens system according to claim 1, wherein said first lens group comprises a negative lens element, a positive lens element and a positive lens element, in that order from the object side, wherein the following condition (6) is satisfied:

$$136 < v2 + v3 \qquad (6),$$

wherein v2 designates the Abbe number with respect to the d-line of the positive lens element that is provided on the object side within said first lens group, and v3 designates the Abbe number with respect to the d-line of the positive lens element that is provided on image side within said first lens group.

5. The high zoom-ratio zoom lens system according to claim 1, wherein said third lens group includes two positive lens elements, and wherein the following condition (7) is satisfied:

$$145 < v4 + v5 \qquad (7),$$

wherein v4 designates the Abbe number with respect to the d-line of one of said two positive lens elements of said third lens group, and v5 designates the Abbe number with respect to the d-line of the other of said two positive lens elements of said third lens group.

6. The high zoom-ratio zoom lens system according to claim 1, wherein said second lens group includes a positive lens element having an aspherical surface on at least one side thereof, and wherein the following condition (8) is satisfied:

$$v6 < 20 \qquad (8),$$

wherein v6 designates the Abbe number with respect to the d-line of said positive lens element having the aspherical surface on at least one side that is provided in said second lens group.

7. The high zoom-ratio zoom lens system according to claim 1, wherein said fourth lens group constitutes a focusing lens group which is moved along the optical axis direction during a focusing operation, said fourth lens group comprising a positive lens element having an aspherical surface on at least one side thereof, and a negative lens element having an aspherical surface on at least one side thereof, in that order from the object side, wherein the following condition (9) is satisfied:

$$|va - vb| > 25 \qquad (9),$$

wherein va designates the Abbe number with respect to the d-line of the positive lens element that is provided within said fourth lens group, and vb designates the Abbe number with respect to the d-line of the negative lens element that is provided within said fourth lens group.

* * * * *